(12) United States Patent
Shirai et al.

(10) Patent No.: US 7,425,375 B2
(45) Date of Patent: Sep. 16, 2008

(54) ORGANIC EL ELEMENT AND ORGANIC EL DISPLAY

(75) Inventors: Satoshi Shirai, Tokyo (JP); Akira Ebisawa, Tokyo (JP); Masahiro Shinkai, Tokyo (JP); Emiko Kambe, Atsugi (JP)

(73) Assignee: TDK Corporation, Tokyo (JP)

( * ) Notice: Subject to any disclaimer, the term of this patent is extended or adjusted under 35 U.S.C. 154(b) by 363 days.

(21) Appl. No.: 10/550,873

(22) PCT Filed: Mar. 29, 2004

(86) PCT No.: PCT/JP2004/004439

§ 371 (c)(1),
(2), (4) Date: Oct. 28, 2005

(87) PCT Pub. No.: WO2004/095888

PCT Pub. Date: Nov. 4, 2004

(65) Prior Publication Data

US 2006/0238110 A1 Oct. 26, 2006

(30) Foreign Application Priority Data

Mar. 28, 2003 (JP) ............................. 2003-092621

(51) Int. Cl.
*H01L 51/54* (2006.01)
*H05B 33/14* (2006.01)
*C09K 11/06* (2006.01)

(52) U.S. Cl. ............. 428/690; 313/504; 313/506; 257/40; 257/E51.024; 257/E51.033; 257/E51.036; 428/917

(58) Field of Classification Search ............ None
See application file for complete search history.

(56) References Cited

U.S. PATENT DOCUMENTS 5,414,069 A * 5/1995 Cumming et al. ........... 528/310
5,670,792 A * 9/1997 Utsugi et al. ................. 257/59
2003/0054200 A1 3/2003 Tagami et al.

FOREIGN PATENT DOCUMENTS

| JP | A-63-070257 | 3/1988 |
| JP | A-63-175860 | 7/1988 |
| JP | A-02-135359 | 5/1990 |
| JP | A-03-037992 | 2/1991 |
| JP | A-03-152184 | 6/1991 |
| JP | A-10-092576 | 4/1998 |
| JP | A-2003-338375 | 11/2003 |
| JP | A-2004-059743 | 2/2004 |
| JP | A-2004-111228 | 4/2004 |

OTHER PUBLICATIONS

Bisberg et al., Macromolecules, (1995), vol. 28, No. 1, pp. 386-389.*
C.W. Tang et al.; "Organic Electroluminescent Diodes"; *Applied Physics Letters;* vol. 51, No. 12; Sep. 21, 1987; pp. 913-915.
R.H. Partridge; "Electroluminescence from Polyvinylcarbazole Films: 3. Electroluminescent Devices"; *Polymer;* vol. 24; Jun. 1983; pp. 748-754.
M.A. Baldo et al.; "Very High-Efficiency Green Organic Light-Emitting Devices Based on Electrophosphorescence"; *Applied Physics Letters;* vol. 75, No. 1; Jul. 5, 1999; pp. 4-6.
Junji Kido; *Organic Electroluminescence Materials and Displays;* Feb. 28, 2001; pp. 216 & 220. (w/ partial trans.).
Satoshi Shirai et al.; "Syntheses of Vinyl Polymers Containing Phenyl Anthracene Pendants and Their Application to Organic EL Devices"; *Polymer Preprints, Japan;* vol. 50, No. 4; 2001; pp. 661. (w/ partial trans.).
S. Tokito et al.; "Flexible Color OLED Display Based on Phosphorescent Polymers"; *IDW. '03;* pp. 1305-1308.

* cited by examiner

*Primary Examiner*—Dawn Garrett
*Assistant Examiner*—Brett A Crouse
(74) *Attorney, Agent, or Firm*—Oliff & Berridge, PLC

(57) ABSTRACT

An organic EL element of the present invention comprises a substrate, an electrode layer, an organic layer, and an electrode layer, whereas the organic layer 3 contains a vinyl polymer obtained by polymerizing a polymerizable monomer containing a compound represented by formula (1) or (2):

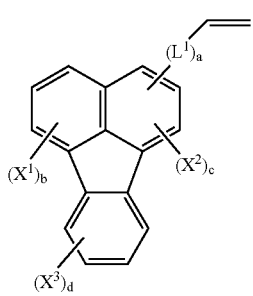

(1)

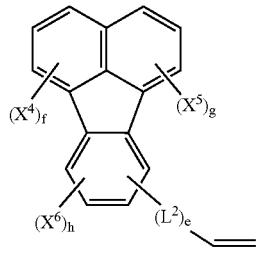

(2)

wherein each of $L^1$ and $L^2$ is a bivalent group; each of $X^1$, $X^2$, $X^3$, $X^4$, $X^5$, and $X^6$ is alkyl group or the like; each of a and e is 0 or 1; each of b, f, g, and h is an integer of 0 to 3; c is an integer of 0 to 2; and d is an integer of 0 to 4.

7 Claims, 2 Drawing Sheets

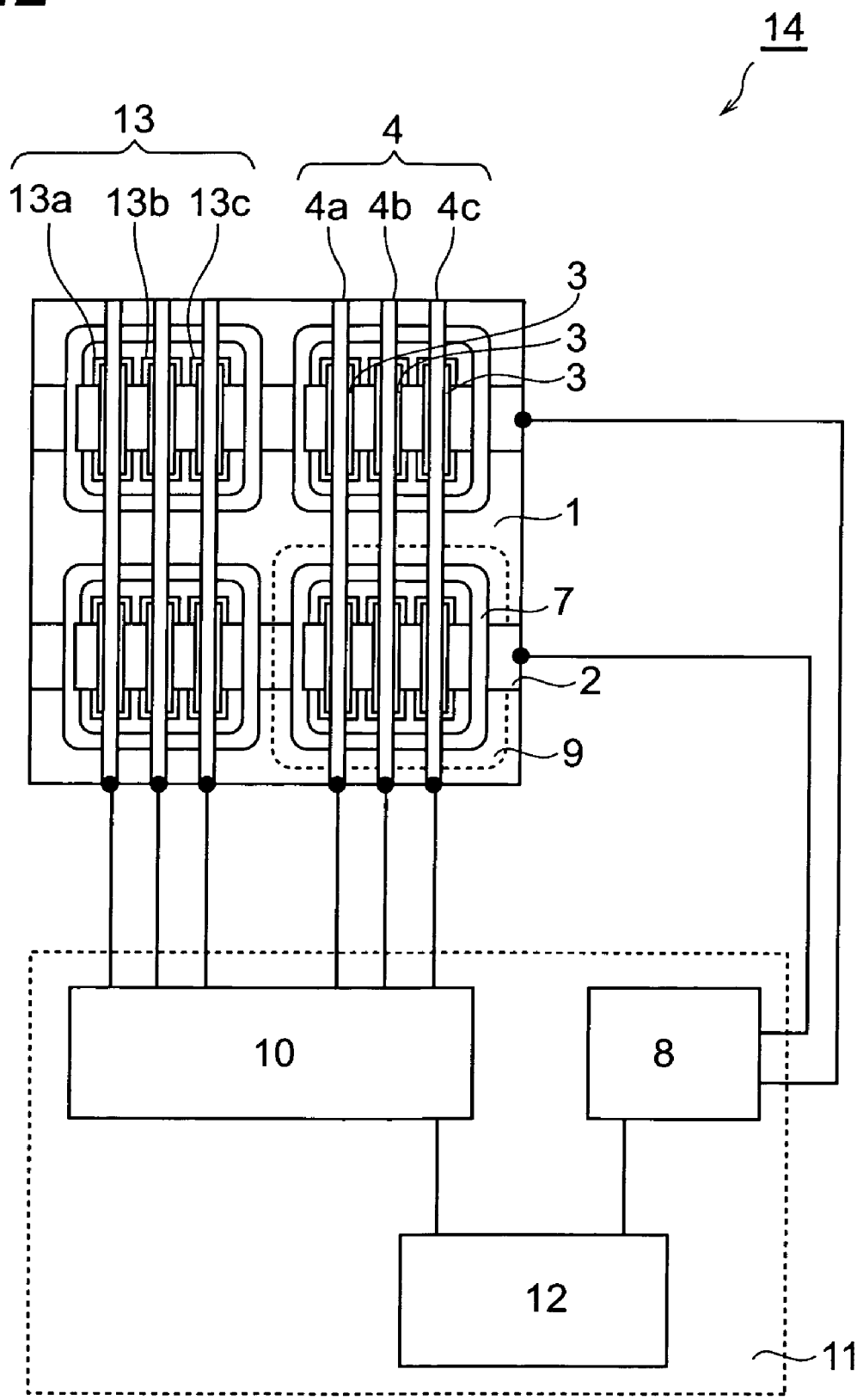

ORGANIC EL ELEMENT AND ORGANIC EL DISPLAY

TECHNICAL FIELD

The present invention relates to an organic EL (electroluminescence) element and an organic EL display.

BACKGROUND ART

In the field of organic EL elements used in organic EL displays and the like, various devices have been manufactured by way of trial according to a technique for forming an organic layer by vacuum deposition using a low molecular weight compound (see, for example, Applied Physics Letters, vol. 51, pp. 913 (1987)), and have been in the process of coming into practical use.

On the other hand, organic EL elements using polymer materials as a constituent material for their organic layers have been under development. In general, such organic EL elements are roughly categorized into those of π-conjugated type using π-conjugated polymers (see, for example, Japanese Patent Application Laid-Open No. HEI 10-92576) and those of molecule dispersion type in which coloring matters are dispersed in nonconjugated polymers (see, for example, Polymer, vol. 24, pp. 748 (1983) and Applied Physics Letters, vol. 75, No. 1, pp. 4 (1999)). Among them, the nonconjugated organic EL elements are advantageous in that they can yield a target color with a high color purity by mixing a predetermined dopant into a host polymer.

DISCLOSURE OF THE INVENTION

However, polymer materials used in conventional molecule dispersion type organic EL elements are not always satisfactory in terms of carrier transportability and stability, whereby the conventional molecule dispersion type EL elements leave a room for improvement in terms of emission efficiency, heat resistance, and life.

In view of the problems in the prior art mentioned above, it is an object of the present invention to provide a molecule dispersion type organic EL element and organic EL display which can achieve all of the heat resistance, life, and emission efficiency at high levels.

The inventors conducted diligent studies in order to achieve the above-mentioned object and, as a result, have found that the above-mentioned problems are overcome by polymerizing a vinyl monomer having a specific structure, so as to yield a vinyl polymer, and using the polymer as a constituent material of an organic layer.

Namely, the organic EL element in accordance with the present invention comprises a substrate, a first electrode layer formed on one side of the substrate, an organic layer formed on the first electrode layer, and a second electrode layer formed on the organic layer; wherein the organic layer contains a vinyl polymer obtained by polymerizing a polymerizable monomer containing a compound represented by the following general formula (1) or (2):

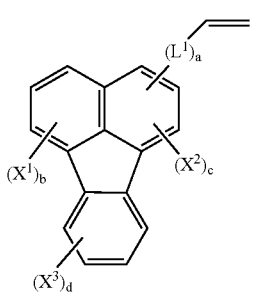

(1)

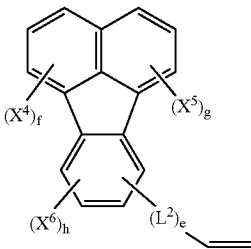

(2)

[In the formulae, each of $L^1$ and $L^2$ is a bivalent group; $X^1$, $X^2$, $X^3$, $X^4$, $X^5$, and $X^6$ are either the same or different from each other, each referring to alkyl group, alkoxy group, aryl group, aryloxy group, heterocyclic group, amino group, halogen atom, or cyano group; each of a and e is 0 or 1; each of b, f, g, and h is an integer of 0 to 3; c is an integer of 0 to 2; d is an integer of 0 to 4; and substituents combined to carbon atoms constituting a fluoranthene ring may be combined together so as to form a ring.]

By polymerizing a polymerizable polymer including a compound represented by the above-mentioned general formula (1) or (2) so as to yield a vinyl polymer and causing an organic layer to contain the vinyl polymer, the organic EL element of the present invention can enhance the transportability of holes and electrons injected into the organic layer from the first and second electrode layers (the electron transportability in particular), thereby sufficiently improving the efficiency in emission due to a dopant for luminescence. The vinyl polymer has a high heat resistance and excellent stability, and thus can stably attain a high-level emission efficiency for a long period. Since the vinyl polymer in accordance with the present invention has a function as a dopant for luminescence, the organic layer is not required to contain a dopant for luminescence other than the vinyl polymer. However, the organic layer may further contain other dopants for luminescence in order to attain a desirable emission color.

Preferably, in the organic EL element of the present invention, the vinyl polymer is obtained by polymerizing a polymerizable polymer containing a compound represented by the following general formula (3). Using this vinyl polymer can further enhance the heat resistance, life, and emission efficiency of the organic EL element.

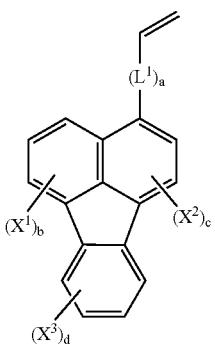

(3)

where $L^1$ is a bivalent group; $X^1$, $X^2$, and $X^3$ are either the same or different from each other, each referring to alkyl group, alkoxy group, aryl group, aryloxy group, heterocyclic group, amino group, halogen atom, or cyano group; a is 0 or 1; b is an integer of 0 to 3; c is an integer of 0 to 2; d is an integer of 0 to 4; and substituents combined to carbon atoms constituting a fluoranthene ring may be combined together so as to form a ring.

Preferably, in the organic EL element of the present invention, the vinyl polymer is obtained by polymerizing a polymerizable monomer containing at least one of a compound represented by the general formula (1) or (3) where $L^1$ is a substituted or unsubstituted phenylene group and a is 1, and a compound represented by the general formula (2) where $L^2$ is a substituted or unsubstituted phenylene group and e is 1. Causing an organic layer to contain a vinyl polymer obtained by using a compound in which a vinyl group and a fluoranthene ring are combined to each other by way a substituted or unsubstituted phenylene group can further enhance the heat resistance, life, and emission efficiency of the organic EL element.

In the organic EL element of the present invention, the vinyl polymer may be a copolymer of at least one species of the compound represented by one of the general formulae (1) to (3) and at least one species of vinyl monomer having a structure different from that of the compound. For example, when at least one species of the compound represented by the general formulae (1) to (3) and at least one other species of vinyl monomer having a carrier transportability are combined together, the degree of freedom in the molecular design of vinyl polymer for imparting a desirable characteristic to the organic layer becomes greater, the minute adjustment of element characteristics becomes easier, and the heat resistance and life can further be enhanced.

In the organic EL element of the present invention, the organic layer may have a single-layer structure in which the organic layer is constituted by a luminescent layer alone, but preferably has a multilayer structure including a luminescent layer and an electron transport layer formed between a layer in the first or second electrode layer for injecting an electron into the luminescent layer and the luminescent layer. Preferably, in thus configured organic layer, at least one of the luminescent layer and electron transport layer contains the vinyl polymer in accordance with the present invention. It will be particularly preferred if both of the luminescent layer and electron transport layer contain the vinyl polymer. This can further enhance the heat resistance, life, and emission efficiency of the organic EL element. The organic EL element of the present invention may further comprise a hole transport layer between an electrode for injecting a hole into the luminescent layer and the luminescent layer.

As mentioned above, the organic layer may further contain a dopant for luminescence other than the vinyl polymer in accordance with the present invention, and preferably further contains a blue-emitting dopant in particular. When the organic layer contains both of the vinyl polymer in accordance with the present invention and the blue-emitting dopant, blue luminescence with a high color purity which has been hard for conventional organic EL elements to achieve can be obtained easily and reliably.

The organic EL display of the present invention comprises a display part in which a plurality of organic EL elements, each constituted by a substrate, a first electrode layer formed on one side of the substrate, an organic layer formed on the first electrode layer, and a second electrode layer formed on the organic layer, are arranged; a power supply part, electrically connected to the first and second electrodes, for supplying a voltage or current to the first and second electrodes; and a switching part for turning on or off the organic EL elements; wherein the organic layer contains a vinyl polymer obtained by polymerizing a polymerizable monomer containing a compound represented by the following general formula (1) or (2):

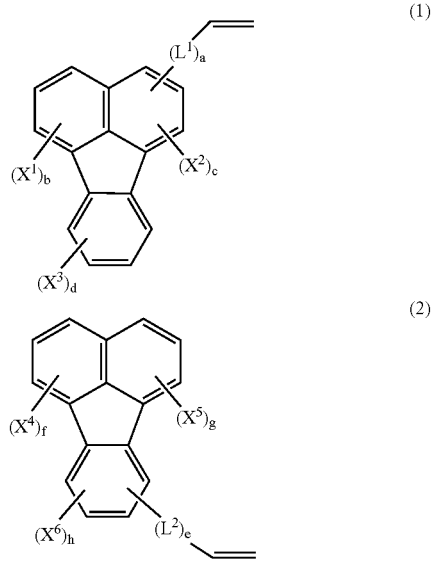

where each of $L^1$ and $L^2$ is a bivalent group; $X^1$, $X^2$, $X^3$, $X^4$, $X^5$, and $X^6$ are either the same or different from each other, each referring to alkyl group, alkoxy group, aryl group, aryloxy group, heterocyclic group, amino group, halogen atom, or cyano group; each of a and e is 0 or 1; each of b, f, g, and h is an integer of 0 to 3; c is an integer of 0 to 2; d is an integer of 0 to 4; and substituents combined to carbon atoms constituting a fluoranthene ring may be combined together so as to form a ring.

When the organic EL elements of the present invention are thus arranged in the display part and driven by the power supply part and switching part, an organic EL display which is excellent in luminance and color displaying functions and has a high heat resistance and long life can be realized.

BRIEF DESCRIPTION OF THE DRAWINGS

FIG. 2 is a block diagram showing a preferred embodiment of the organic EL display in accordance with the present invention.

BEST MODES FOR CARRYING OUT THE INVENTION

Figure 1:
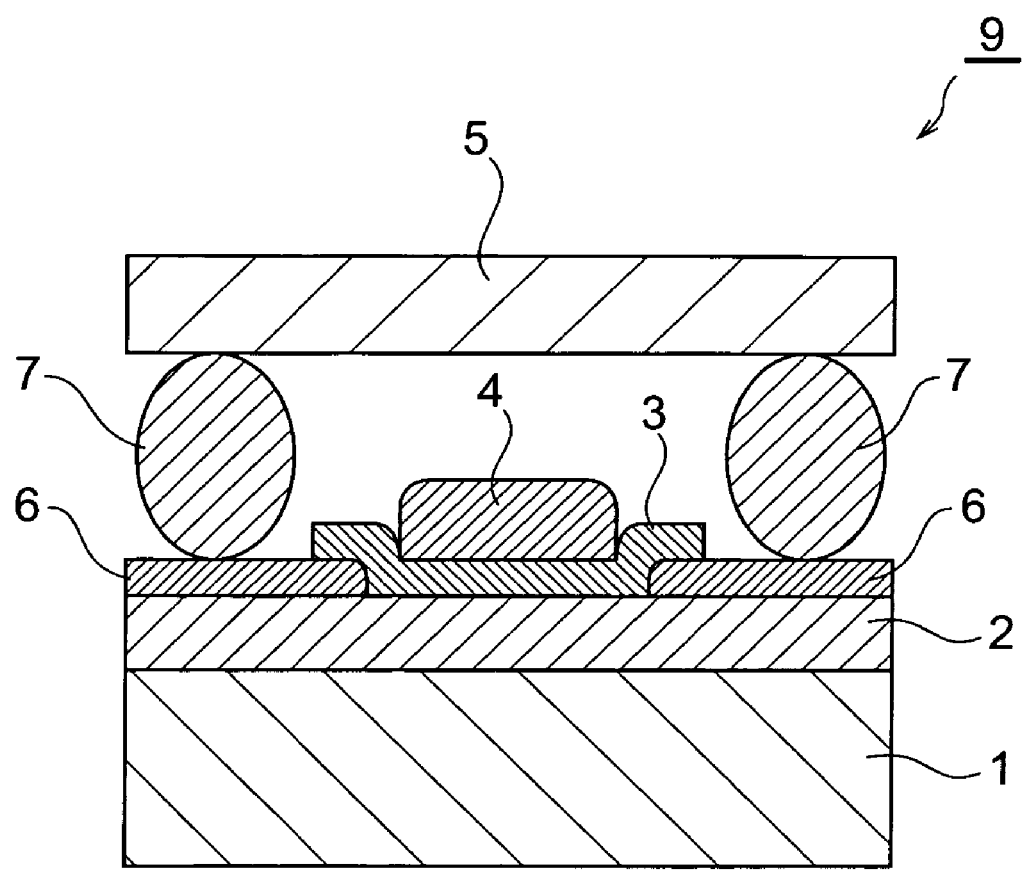
FIG. 1 is a schematic sectional view showing a preferred embodiment of the organic EL element in accordance with the present invention.

In the following, preferred embodiments of the present invention will be explained in detail with reference to the drawings as the case may be. In the drawings, constituents identical to each other will be referred to with numerals identical to each other without repeating their overlapping explanations. Positional relationships such as upper, lower, left, and right are based on those shown in the drawings unless otherwise specified. Ratios of dimensions in the drawings are not restricted to those depicted.

First, a vinyl polymer included in an organic layer in the organic EL element of the present invention will be explained. The organic layer in accordance with the present invention includes a polymer (which may hereinafter be referred to as "vinyl polymer in accordance with the present invention" as the case may be) obtained by polymerizing a polymerizable monomer containing a compound represented by the following general formula (1) or (2), preferably the general formula (3):

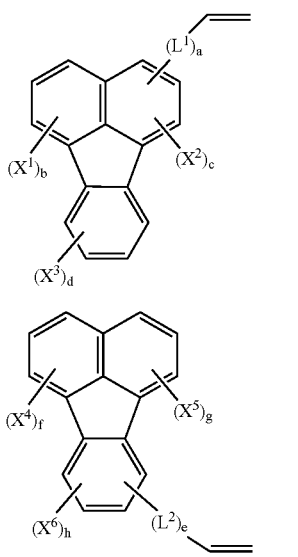

(1)

(2)

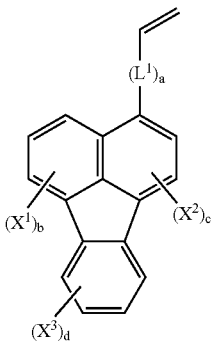

(3)

The compound represented by the above-mentioned general formula (1) or (2) is one in which a vinyl group, which is a polymerizable functional group, is introduced into fluoranthene or a fluoranthene derivative, which has a high electron mobility, and more specifically one in which a group represented by -(L$^1$)$_a$-CH=CH$_2$ or -(L$^2$)$_e$-CH=CH$_2$ is combined with a carbon atom constituting a fluoranthene ring. When introducing a vinyl group to fluoranthene or a fluoranthene derivative, Suzuki reaction, Grignard reaction, or the like is used, whereby a target compound can be obtained without affecting the vinyl group.

In the formulae, each of L$^1$ and L$^2$ is a bivalent group. Examples of the bivalent group include alkylene groups such as methylene group, ethylene group, and propylene group, and arylene groups such as phenylene group. These bivalent groups may have substituent groups or may be unsubstituted. Each of a and e is 0 or 1. When both a and e are 0, a structure in which a vinyl group is directly combined with a carbon atom constituting a fluoranthene derivative is obtained.

Preferred as the groups represented by -(L$^1$)$_a$-CH=CH$_2$ and -(L$^2$)$_e$-CH=CH$_2$ are those in which each of L$^1$ and L$^2$ is a substituted or unsubstituted phenylene group while each of a and d is 1 (i.e., a substituted or unsubstituted vinyl phenylene group). In the substituted or unsubstituted phenylene group, it will be preferred if the vinyl group is combined at p-position with respect to a carbon atom of a fluorene ring combined with the phenylene group.

Though the position at which the group represented by -(L$^1$)$_a$-CH=CH$_2$ or -(L$^2$)$_e$-CH=CH$_2$ is combined with the fluoranthene group is not restricted in particular, a compound in which the group represented by -(L$^1$)$_a$-CH=CH$_2$ is combined with the fluoranthene ring at the 3-position, i.e., the compound represented by the following general formula (3), is preferred:

In the formulae, X$^1$, X$^2$, X$^3$, X$^4$, X$^5$, and X$^6$ are substituent groups combining with constituent carbons of the fluoranthene ring, each being alkyl group, alkoxy group, aryl group, aryloxy group, heterocyclic group, amino group, halogen atom, or cyano group. On the other hand, b, c, d, f, g, and h refer to respective numbers of X$^1$, X$^2$, X$^3$, X$^4$, X$^5$, and X$^6$, in which each of f, g, and h is an integer of 0 to 3, c is an integer of 0 to 2, and d is an integer of 0 to 4. When there are a plurality of substituent groups combining with constituent carbons of the fluoranthene ring, they may be either the same or different from each other. The substituent groups may be combined together to form a ring as well.

When the substituent group represented by any of X$^1$ to X$^6$ is an alkyl group, it may be either straight or branched. The alkyl group is preferably unsubstituted, but may have a substituent group. The number of carbons in the alkyl group is preferably 1 to 10. Preferred examples of the alkyl group include methyl group, ethyl group, n-propyl group, isopropyl group, n-butyl group, isobutyl group, s-butyl group, t-butyl group, and pentyl group.

When the substituent group represented by any of X$^1$ to X$^6$ is an alkoxy group, it may be either straight or branched. The alkoxy group is preferably unsubstituted, but may have a substituent group. The number of carbons in the alkyl group is preferably 1 to 10. Preferred examples of the alkoxy group include methoxy group, ethoxy group, n-propoxy group, isopropoxy group, n-butoxy group, isobutoxy group, s-butoxy group, and t-butoxy group.

When the substituent group represented by any of X$^1$ to X$^6$ is an aryl group, it may be either substituted or unsubstituted. The total number of carbons in the aryl group is preferably 6 to 20. Preferred examples of the aryl group include phenyl group, o-tolyl group, m-tolyl group, p-tolyl group, and biphenylyl group.

When the substituent group represented by any of X$^1$ to X$^6$ is an aryloxy group, it may be either substituted or unsubstituted. The total number of carbons in the aryloxy group is preferably 6 to 20. Preferred examples of the aryloxy group include phenoxy group, o-tolyloxy group, m-tolyloxy group, and p-tolyloxy group.

When the substituent group represented by any of X$^1$ to X$^6$ is a heterocyclic group, it is preferably a 5- or 6-membered ring. The heterocyclic ring may have either a condensed ring or substituent group. The heterocyclic ring may be either aromatic or nonaromatic. Examples of the heterocyclic ring include pyrrolyl group, pyridyl group, quinolyl group, thienyl group, and furyl group.

When the substituent group represented by any of X$^1$ to X$^6$ is a halogen atom, its examples include fluorine, chlorine, bromine, and iodine.

When the substituent group represented by any of $X^1$ to $X^6$ is an amino group, the amino group may be either substituted or unsubstituted, and may have the above-mentioned alkyl or aryl group, for example. The total number of carbons in the amino group is preferably 0 to 20. Preferred examples of the amino group include amino group ($—NH_2$) in the narrow sense, methylamino group, ethylamino group, phenylamino group, dimethylamino group, and diphenylamino group.

In the compound represented by any of general formulae (1) to (3), it will be preferred in particular if the fluoranthene ring has no substituent group or any of substituent groups of alkyl group, alkoxy group, and aryl group (more preferably alkyl group or aryl group).

Among the compounds represented by general formula (1) or (2), those represented by the following formulae (4) to (48) are used preferably, and those represented by the following formulae (5), (7), (8), (9), (10), (11), (12), (28), (29), (30), (31), (32), (33), (34), (37), (38), (39), (40), (41), (46), (47), and (48) are used more preferably. From the viewpoint of solubility, compounds represented by the following formulae (5), (7), (31), (32), (34), (37), (38), and (40) are used preferably in particular.

(4)

(5)

-continued

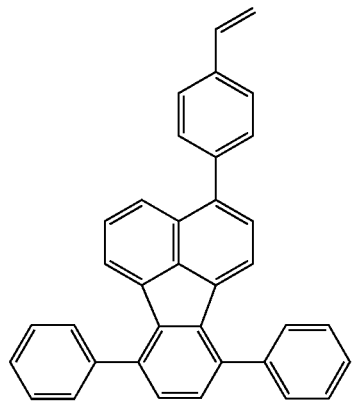

(6)

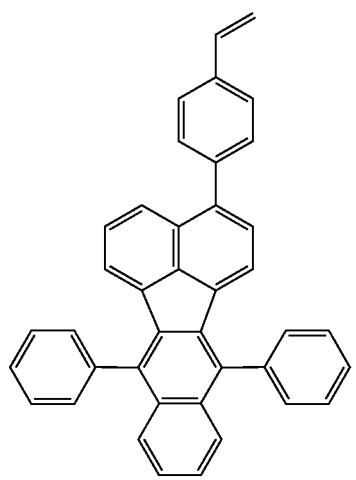

(7)

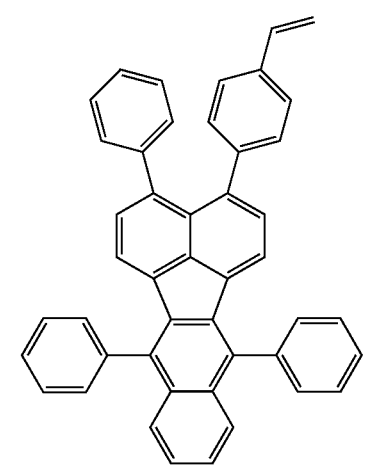

(8)

-continued
(9)
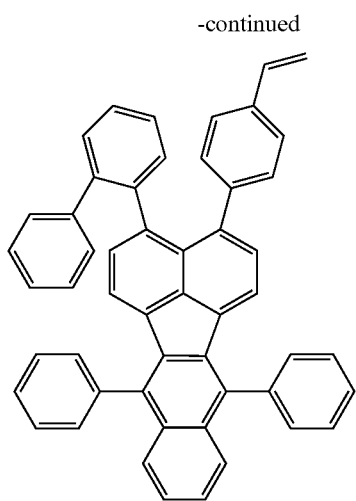
(10)
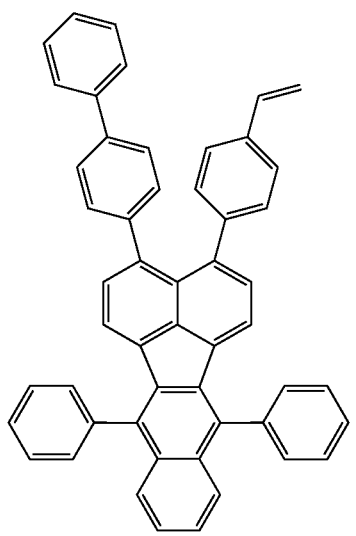
(11)
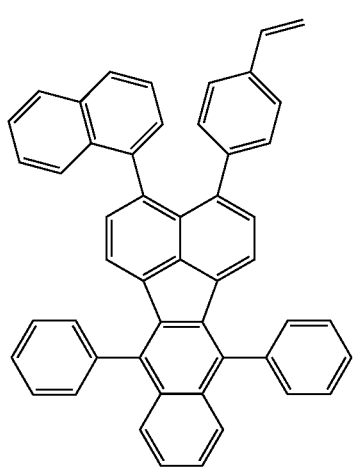
-continued
(12)
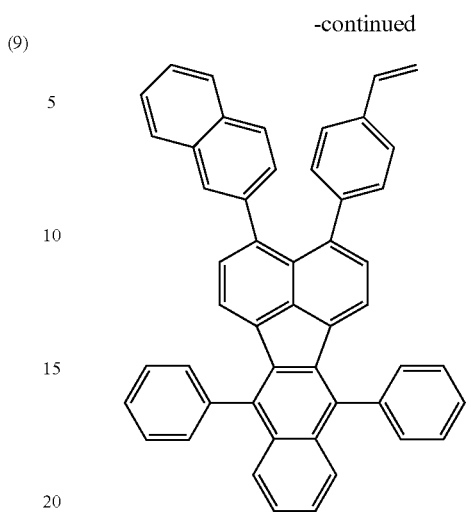
(13) (14)
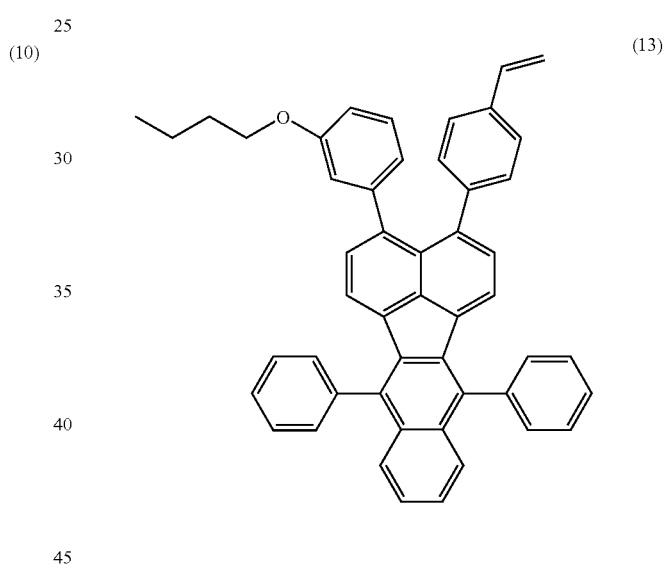
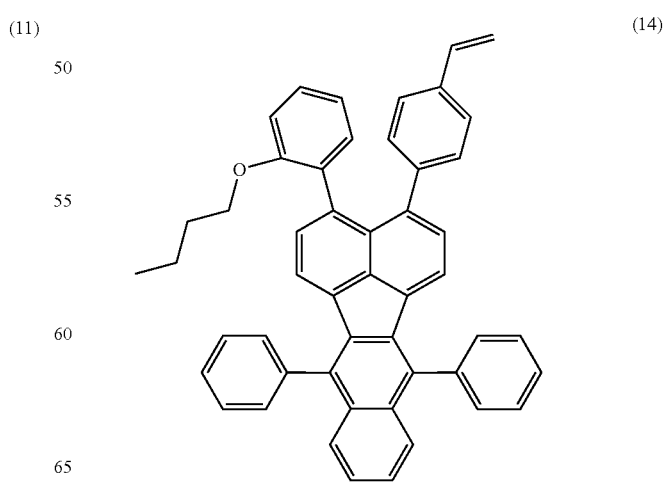

-continued
(15)
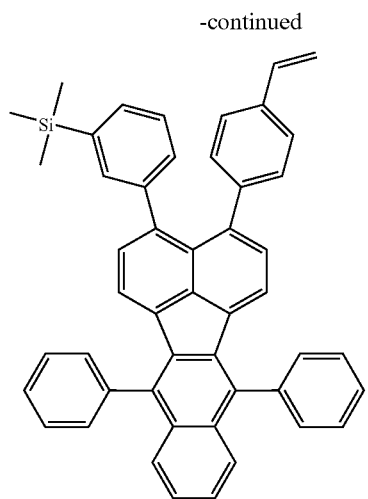
(16)
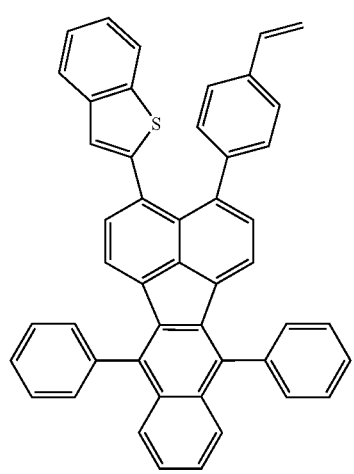
(17)
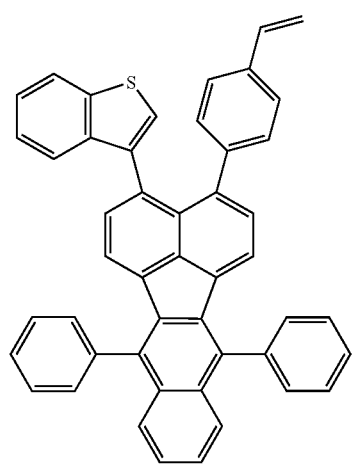
-continued
(18)
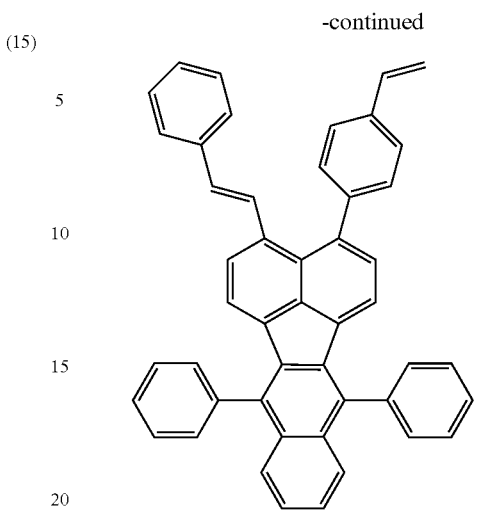
(19)
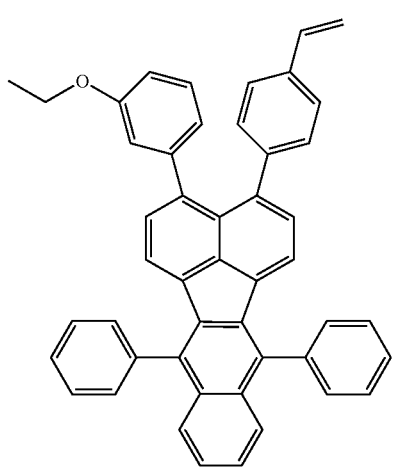
(20)
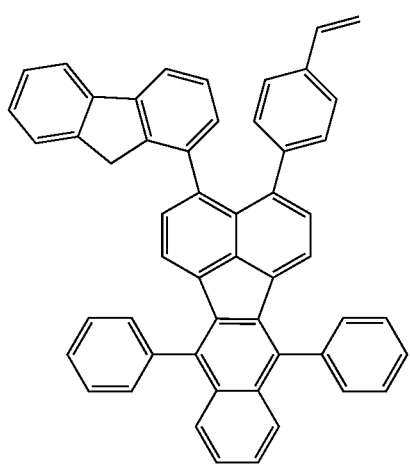

-continued
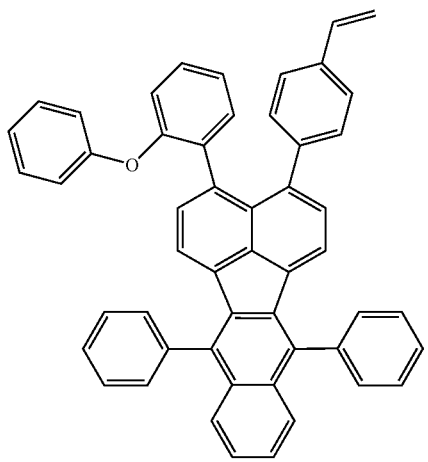
(21)
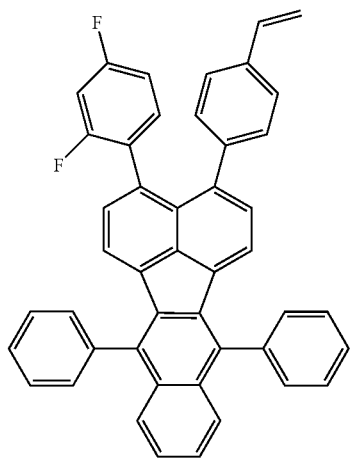
(24)
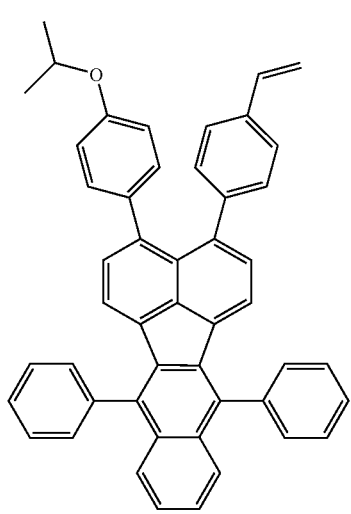
(22)
(25)
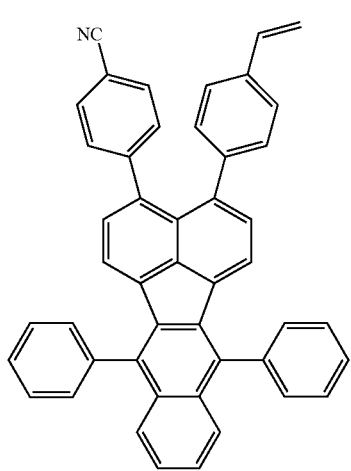
(23)
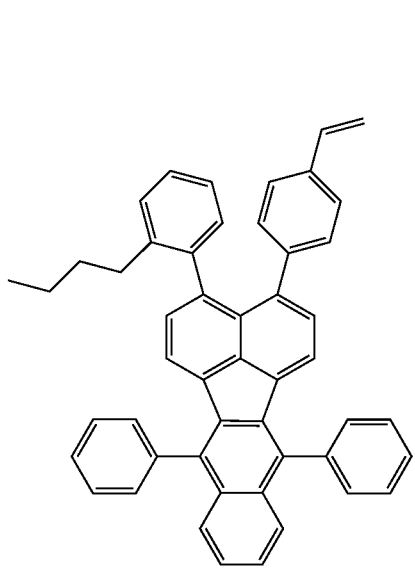
(26)

(27)
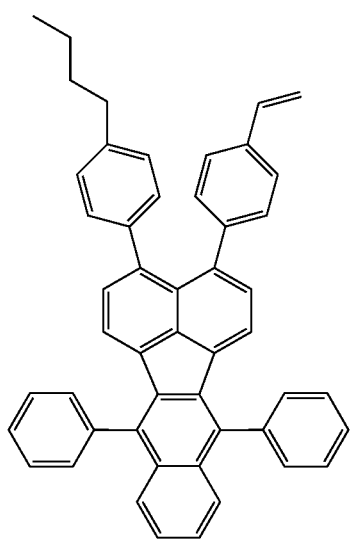
(28)
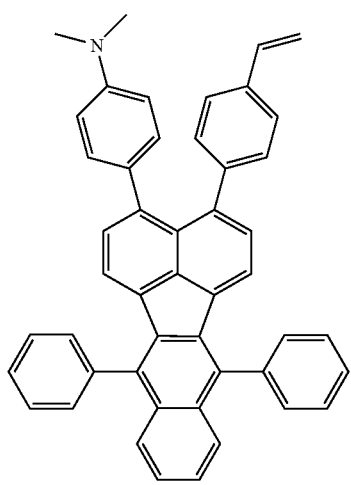
(29)
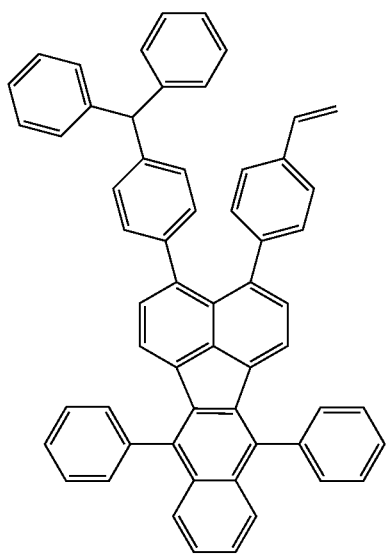
(30)
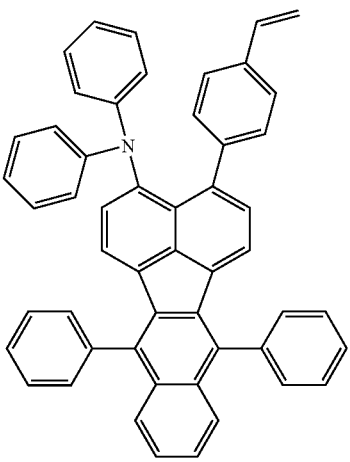
(31)
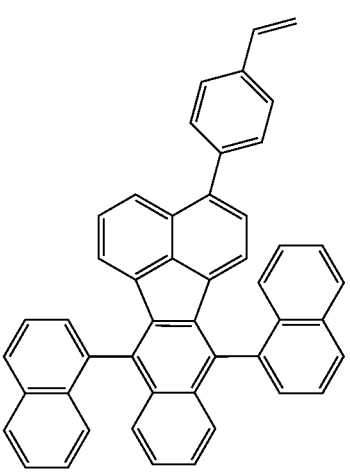
(32)
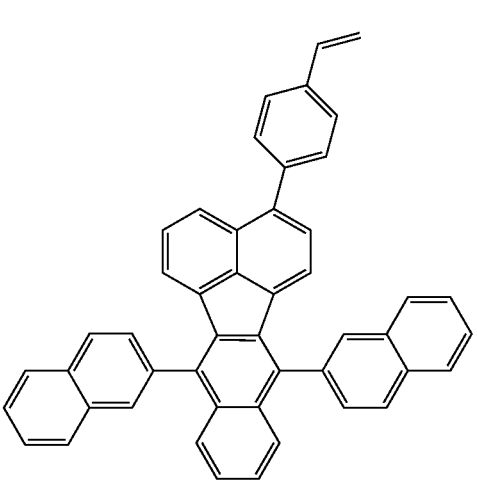

-continued
(33)
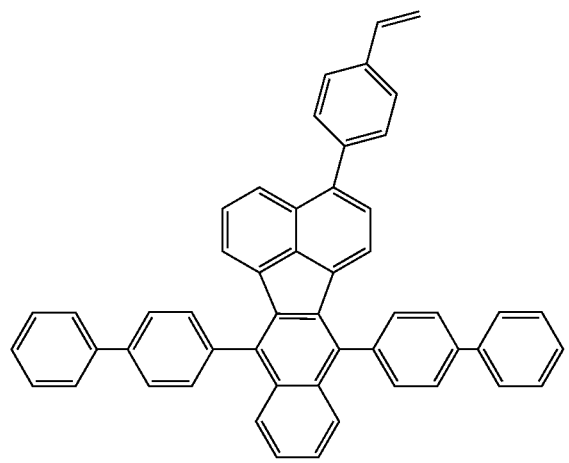
(34)
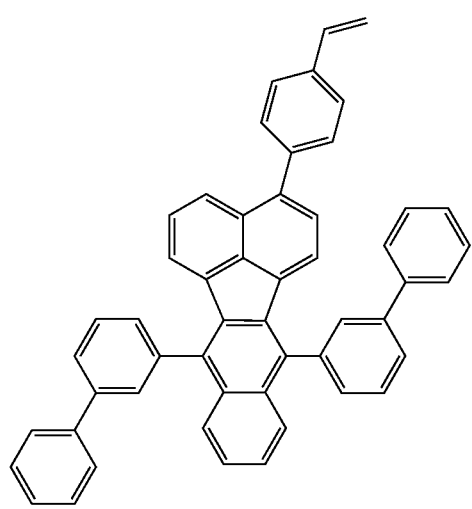
(35)
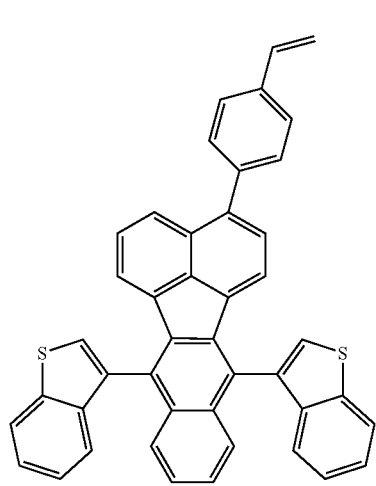
-continued
(36)
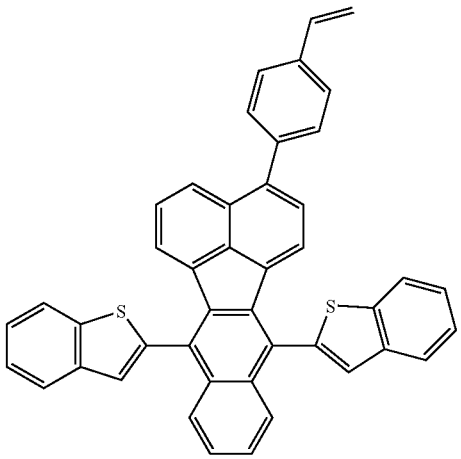
(37)
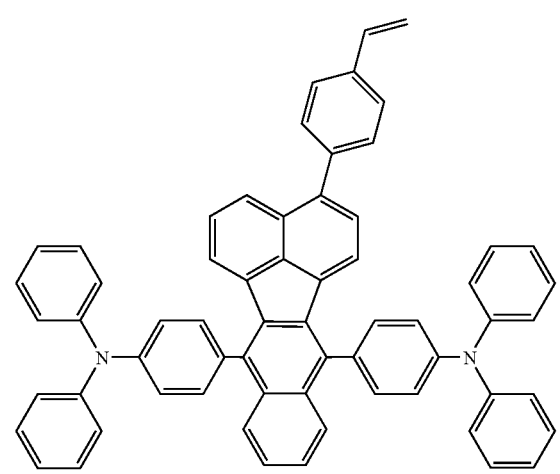
(38)

-continued
(39)
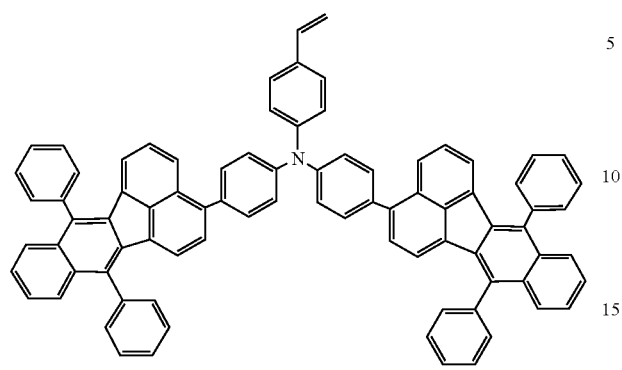
(40)
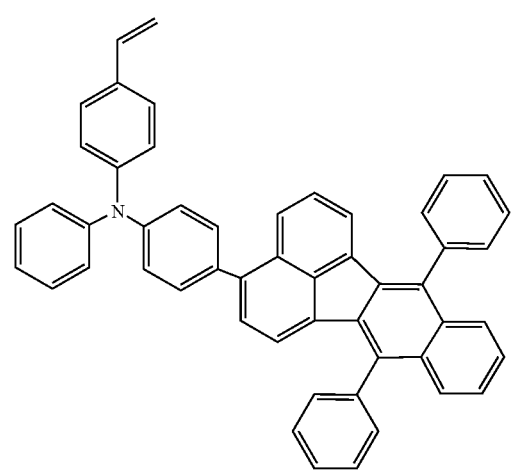
(41)
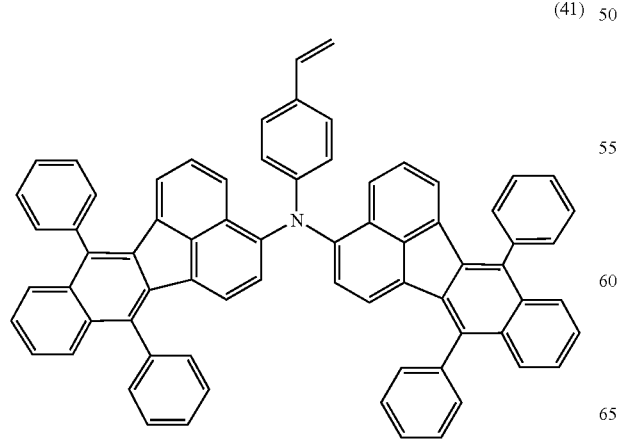
-continued
(42)
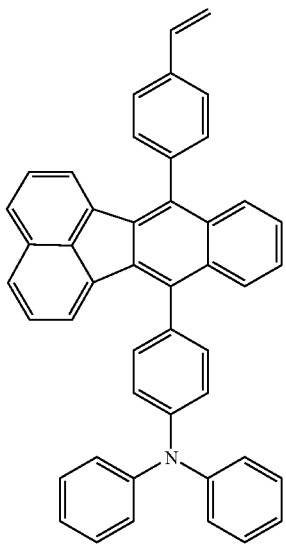
(43)
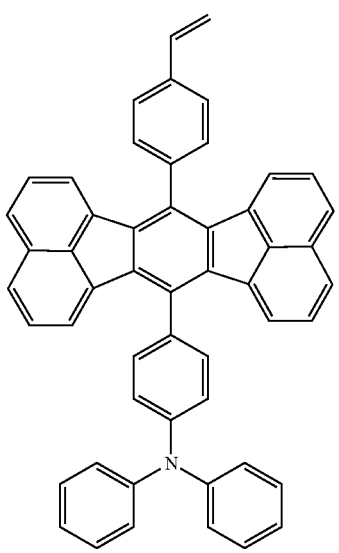
(44)
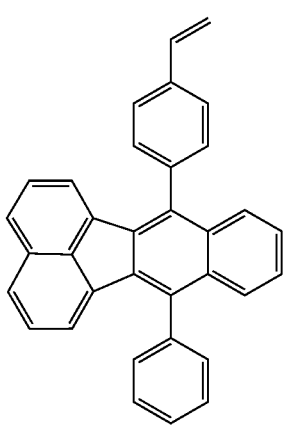

-continued (45)

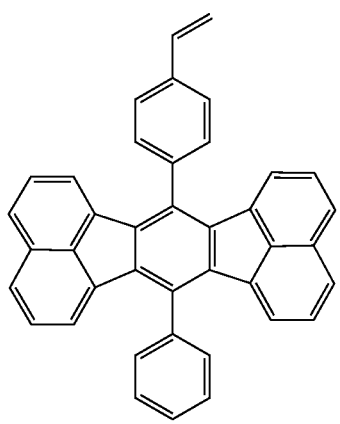

(46)

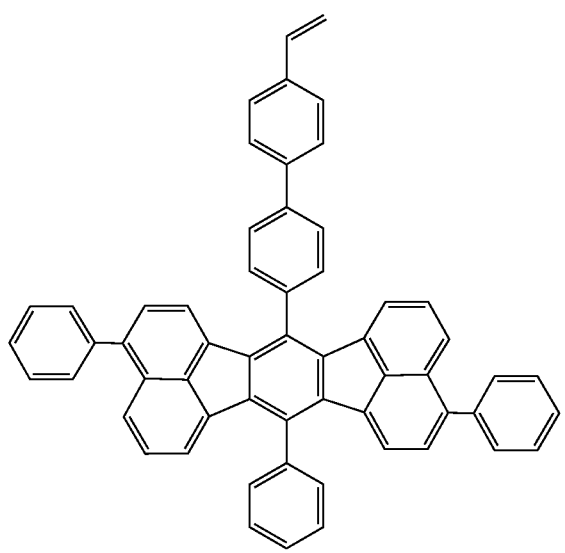

(47)

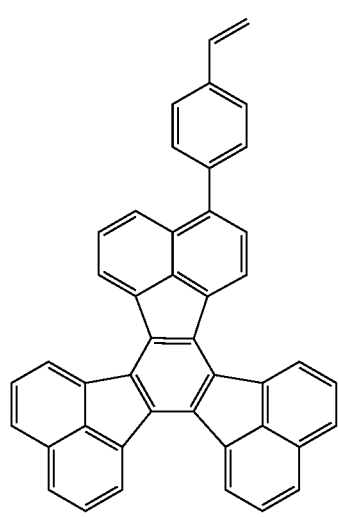

-continued (48)

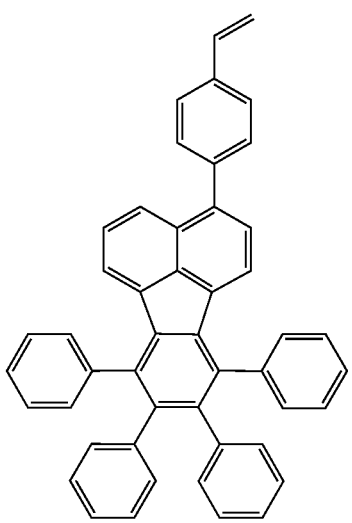

The vinyl polymer in accordance with the present invention may be a homopolymer of one species of the compounds represented by the above-mentioned general formula (1) or (2), or a copolymer of at least two species of the compounds represented by the above-mentioned general formula (1) or (2). Namely, this polymer is one having at least one of constituent units represented by the following general formulae (49) and (50):

(49)

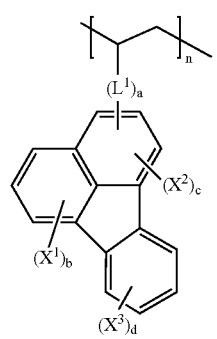

(50)

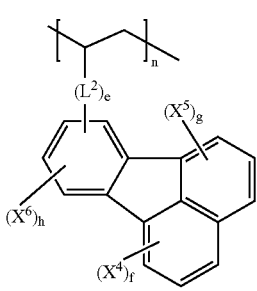

The polymer may be a copolymer formed between a compound represented by the above-mentioned general formula (1) or (2) and a vinyl monomer having a structure different from that of the compound. For example, for further enhancing the electron transportability of the polymer, 4-vinylpyridine represented by the following formula (51), 2-vinylpyridine represented by the following formula (52), 1-vinylimidazole represented by the following formula (53), and the like can be used therewith. For further enhancing the hole transportability of the polymer, N-vinylcarbazole represented by the following formula (54), (4-vinlylphenyl)diphenylamine represented by the following formula (55), and the like may be used therewith. The ratio of the vinyl monomer is not restricted in particular, but is preferably 1 to 50 mol %, more preferably 1 to 30 mol %, based on the total amount of the polymerizable monomers constituting the polymer.

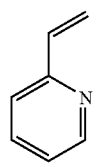

(51)

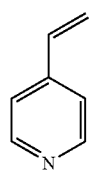

(52)

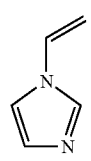

(53)

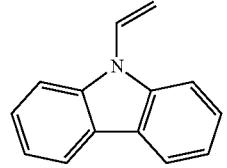

(54)

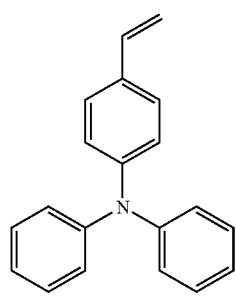

(55)

The method of polymerizing the compound represented by the above-mentioned general formula (1) or (2) is not restricted in particular, whereby the compound can easily be combined by radical polymerization, cationic polymerization, anionic polymerization, or the like. The weight-average molecular weight of the resulting polymer is preferably 10,000 to 1,000,000.

In the present invention, the organic layer in the organic EL element is caused to contain the polymer, whereby the transportability of holes and electrons injected into the organic layer from the first and second electrode layers (the electron transportability in particular) can be enhanced, so as to sufficiently improve the emission efficiency. This polymer has a high heat resistance and excellent stability, and thus can stably attain a high-level emission efficiency for a long period.

The reason why the above-mentioned polymer is excellent in carrier transportability, heat resistance, and stability is not definitely clear, but is presumed by the inventors as follows. In the polymer, obtained by the compound represented by the general formula (1) or (2), having the constituent unit represented by the general formula (49) or (50), it seems that a helical structure is formed by a polyvinyl chain, whereas a plurality of fluoranthene rings are arranged at predetermined intervals in an overlapping fashion on the outside of the helical structure, whereby a cyclic structure which is effective in carrier transportability (electron transportability in particular) and stable can be attained.

The organic EL element of the present invention will now be explained.

FIG. 1 is a schematic sectional view showing a preferred embodiment of the organic EL element in accordance with the present invention. In the organic EL element 9 shown in FIG. 1, an anode layer 2 (first electrode layer) and an insulator layer 6 are laminated in this order on a substrate 1, whereas a part of the insulator layer 6 corresponding to a luminescent part is provided with an opening at which the anode layer 2 is exposed. An organic layer 3 and a cathode layer 4 (second electrode layer) are laminated on thus exposed anode layer 2, so as to form a laminate structure of the substrate 1/anode layer 2/organic layer 3/cathode layer 4. The organic layer 3 contains a dopant for luminescence and a vinyl polymer obtained by polymerizing a polymerizable monomer containing a compound represented by the above-mentioned general formula (1) or (2). The face of the organic EL element 9 on the cathode layer 2 side is sealed with a sealing plate 5 by way of a spacer 7 disposed on the insulator layer in the nonluminescent region.

Substrate

Employable as the substrate 1 are amorphous substrates made of glass, silica, and the like; crystal substrates made of Si, GaAs, ZnSe, ZnS, GaP, InP, and the like; metal substrates made of Mo, Al, Pt, Ir, Au, Pd, SUS, and the like; etc. Also usable are those in which thin films made of crystalline or amorphous ceramics, metals, organic matters, and the like are formed on predetermined substrates.

When the side of the substrate 1 is employed as the light outlet side, a transparent substrate made of glass, silica, or the like is preferably used as the substrate 1. It will be preferred in particular if a transparent substrate made of inexpensive glass is used. For adjusting the emitted color light, the transparent substrate may be provided with a color filter film, a color-converting film containing a phosphor material, a dielectric reflecting film, or the like.

Anode Layer

The anode layer 2 functions as an electrode for injecting holes into the organic layer 3. To this aim, a material which can efficiently inject holes into the organic layer is preferred as the material for the anode layer 2. More specifically, a material having a work function of 4.5 to 5.4 eV is preferred.

When the side of the substrate 1 is employed as the light outlet side, the transmittance of the organic EL element in the wavelength region of 400 to 700 nm, which is the luminescent wavelength region thereof, at the respective wavelengths of RGB colors in particular, is preferably not less than 50%, more preferably not less than 80%, further preferably not less than 90%. When the transmittance of the anode layer 2 is less than 50%, the emission from the organic layer 3 is attenuated, whereby a luminance required for displaying images is harder to attain.

The anode layer exhibiting a high light transmittance can be constructed by a transparent conductive film constituted by various oxides. Preferred as such a material are indium oxide ($In_2O_3$), tin oxide ($SnO_2$), zinc oxide (ZnO), tin-doped indium oxide (ITO), zinc-doped indium oxide (IZO), and the like. Among them, ITO is particularly preferred in that a thin film having a uniform resistivity within a plane can easily be obtained. The ratio of $SnO_2$ to $In_2O_3$ in ITO is preferably 1 to 20 wt %, more preferably 5 to 12 wt %. The ratio of ZnO to $In_2O_3$ in IZO is preferably 12 to 32 wt %. The materials mentioned above may be used singly or in combination of two or more species.

The composition of the oxide constituting the anode layer 2 may somewhat deviate from its stoichiometric composition. For example, though ITO usually contains $In_2O_3$ and $SnO_2$ in a stoichiometric composition, it will be sufficient if x and y fall within the ranges of 1.0 to 2.0 and 0.8 to 1.2, respectively, when the composition of ITO is represented by $InO_x \cdot SnO_y$.

Adding a transparent dielectric such as silicon oxide ($SiO_2$) to the anode layer 2 can adjust the work function of the anode layer 2. For example, adding about 0.5 to 10 mol % of $SiO_2$ to ITO can enhance the work function of ITO, so that the work function of the anode layer 2 falls within the preferred range mentioned above.

Preferably, the thickness of the anode layer 2 is determined in view of the above-mentioned light transmittance. For example, when an oxide transparent conductive film is used, its thickness is preferably 50 to 500 nm, more preferably 50 to 300 nm. When the thickness of the anode layer 2 exceeds 500 nm, the light transmittance may become insufficient, while the anode layer 2 may peel off from the substrate 1. The light transmittance improves as the thickness decreases. When the film thickness is less than 50 nm, however, the efficiency of hole injection into the organic layer 3 drops, while the film strength decreases.

Though FIG. 1 shows an example of organic EL element in which the anode 2 is disposed on the substrate 1, whereas the cathode layer 4 is arranged on the side remote from the substrate 1 by way of the organic layer 3, the positions of the anode layer 2 and cathode layer 4 may be reversed. When the cathode layer 4 is disposed on the substrate 1, the cathode layer 4 side can be employed as the light outlet side. It will be preferred in this case if the cathode layer 4 satisfies the optical and thickness conditions mentioned above.

Insulator Layer

Preferably, in the organic EL element of the present invention, the insulator layer 6 is disposed in the nonluminescent region on the anode layer 2. Providing the insulator layer 6 can regulate the luminescent area, so as to restrain colors from blurring. For the material of the insulator layer 6, general insulator film materials such as $SiO_2$ and $Al_2O_3$, for example, can selectively be used as appropriate. The thickness of the insulator layer 6 is preferably about 1 to 7 μm. The part of the insulator layer 6 corresponding to the luminescent region is provided with an opening by a technique of lithography or etching such that the anode layer 2 is exposed, whereas the organic layer 3 and the cathode layer 4 (second electrode layer) are laminated in this order on the exposed anode layer 2. This secures electric conduction between the anode layer 2 and organic layer 3.

Organic Layer

The organic layer 3 is a luminescent layer containing a dopant for luminescence and the vinyl polymer in accordance with the present invention as mentioned above.

The dopant for luminescence can be selected as appropriate according to target emission colors. For example, as a phosphorescent dopant, iridium complexes such as tris(2-phenylpyridine) iridium ($Ir(ppy)_3$), platinum complexes having a porphyrin ring such as 2, 3, 7,8,12,13,17,18-octaethyl-21H,23H-porphyrin platinum (PtOEP), and the like can be used. As a blue-emitting dopant, tetraphenyl butadiene and its derivatives, styrylamine derivatives, fluoranthene derivatives, and the like can be used. The ratio of the dopant for luminescence to the total amount of the polymerizable monomer before polymerization is preferably 1 to 15 wt %. Since the vinyl polymer in accordance with the present invention has a function as a luminescent dopant, the organic layer 3 is not required to include any luminescent dopant other than the vinyl polymer in accordance with the present invention.

The organic layer 3 contains the luminescent dopant and the vinyl polymer in accordance with the present invention, and may further contain other carrier-transporting materials such as hole-transporting materials and electron-transporting materials.

Any of low and high molecular weight materials can be used as a hole-transporting material. Examples of hole-transporting low molecular weight materials include pyrazoline derivatives, arylamine derivatives, stilbene derivatives, and triphenyldiamine derivatives. Examples of hole-transporting high molecular weight materials include polyvinylcarbazole, polyethylene dioxythiophene/polystyrene sulfonate copolymer (PEDOT/PSS), and polyaniline/polystyrene sulfonate copolymer (Pani/PSS). These hole-transporting materials may be used singly or in combination of two or more species.

Any of low and high molecular weight materials can be used as an electron-transporting material. Examples of electron-transporting low molecular weight materials include oxadiazole derivatives, anthraquinodimethane and its derivatives, benzoquinone and its derivatives, naphthoquinone and its derivatives, anthraquinone and its derivatives, tetracyanoanthraquinodimethane and its derivatives, fluorene and its derivatives, diphenyldicyanoethylene and its derivatives, phenanthroline and its derivatives, and metal complexes including these compounds as ligands. Examples of electron-transporting high molecular weight materials include polyquinoxaline and polyquinoline. These electron-transporting materials may be used singly or in combination of two or more species.

For the low molecular weight materials and their modes of use, techniques disclosed in Japanese Patent Application Laid-Open Nos. SHO 63-70257, SHO 63-175860, HEI 2-135359, HEI 3-37992, HEI 3-152184, and the like can be used, for example.

The organic layer 3 can favorably be formed by coating. Employed at the time of coating is a coating liquid in which a dopant for luminescence, the vinyl polymer in accordance with the present invention, and other carrier-transporting materials used as necessary are added to a predetermined solvent. The solvent in the coating liquid is not restricted in particular as long as it is one adapted to dissolve the vinyl polymer in accordance with the present invention and does not generate any obstacle at the time of coating. For example, organic solvents such as those based on alcohols, hydrocarbons, ketones, and ethers can be used. Preferred among them are chloroform, methylene chloride, dichloroethane, tetrahydrofuran, toluene, xylene, cyclohexanone, dimethylformamide, N-methylpyrrolidone, and the like. The amount of the vinyl polymer in accordance with the present invention dissolved in the solvent is appropriately selected according to the structure, molecular weight, and the like of the vinyl polymer, and is preferably not less than 0.1 wt %.

The coating liquid is applied so as to cover the opening of the insulator layer 6 at which the anode layer 2 is exposed, and the solvent is eliminated from the coating liquid, whereby the organic layer 3 is formed. Though the method of coating with the coating liquid is not restricted in particular, spin coating, spray coating, dip coating, ink jetting, and printing, for example, are employable. The solvent can be eliminated from the coating liquid by heating and drying preferably at a temperature of 30 to 200° C., more preferably at a temperature of 60 to 100° C. under reduced pressure or in an inert gas atmosphere.

The thickness of the organic layer 3 is not restricted in particular and may vary depending on its forming method, but is preferably 5 to 500 nm, more preferably 10 to 300 nm.

Though FIG. 1 shows an example of organic EL element in which the organic layer 3 has a single-layer structure solely constituted by a luminescence layer containing a dopant for luminescence and the vinyl polymer in accordance with the present invention, the organic layer in the organic EL element of the present invention may have a multilayer structure in which a plurality of layers are laminated.

An example of the organic layer having a multilayer structure is one in which a hole transport layer is disposed between a luminescent layer and an anode layer, whereas an electron transport layer is disposed between the luminescent layer and a cathode layer, whereby the hole transport layer, luminescent layer, and electron transport layer are laminated in this order from the side closer to the anode layer. This can regulate abilities of the anode and cathode layers to inject holes and electrons into the luminescent layer, and the mobility of their electric charges. In such an organic layer having a multilayer structure, while the above-mentioned hole- and electron-transporting materials can be used as respective materials for the hole and electron transport materials, it will be preferred if at least one of the luminescent layer and electron transport layer contains the vinyl polymer in accordance with the present invention. It will be preferred in particular if both of the luminescent layer and electron transport layer contain the polymer. This can further enhance the heat resistance, life, and emission efficiency of the organic EL element.

Cathode Layer

The cathode layer 4 functions as a layer for injecting electrons into the organic layer 3. Specific modes of the cathode layer include inorganic electron injection layers, electron injection layers made of coating films of organic metal complexes, and electron injection layers made of coating films of metal salts. A laminate made of these electron injection layers and an auxiliary electrode layer laminated thereon may also be employed as the cathode layer 4. In this laminate, the inorganic electron injection layers, coating films of organic metal complexes, and coating films of metal salts are disposed on the side closer to the organic layer 3, whereas the auxiliary electrode layer is arranged on the side farther from the organic layer 3.

When forming an inorganic electron injection layer, an inorganic material having a low work function is preferably selected in order to make it easier to inject electrons into the organic layer 3. Examples of the inorganic material include alkali metals such as Li, Na, K, and Cs; alkaline-earth metals such as Mg, Ca, Sr, and Ba; and alkali halides such as LiF and CsI. Also, metals having characteristics similar to those of alkali metals or alkaline-earth metals such as La, Ce, Sn, Zn, and Zr can be used. Among them, Ca is preferred in particular because of its very low work function.

The thickness of the inorganic electron injection layer is not restricted in particular as long as electrons can be injected into the organic layer 3, but is preferably 0.1 to 100 nm, more preferably 1.0 to 50 nm, when an alkali metal or alkaline-earth metal is used. When an alkali halide is used, the thickness is preferably as small as possible from the viewpoint of the capability of injecting electrons into the organic layer 3. Specifically, the thickness is preferably not more than 10 nm, more preferably not more than 1 nm.

The electron injection layer constituted by a coating film of an organic metal complex can be formed, for example, by coating the organic layer 3 with a coating liquid in which an organic metal complex is added to a predetermined solvent by a coating method such as spin coating and then eliminating the solvent. As the organic metal complex, β-diketonato complexes, quinolinol complexes, and the like can be used. The metal in the organic metal complex is not restricted in particular, examples of which include alkali metals such as Li, Na, K, and Cs; alkaline-earth metals such as Mg, Ca, Sr, and Ba; and metals such as La, Ce, Sn, Zn, and Zr having characteristics similar to those of alkali metals or alkaline-earth metals. Causing the coating film of the organic metal complex to further contain an electron-transporting high molecular weight material and the like can further improve electric characteristics of the electron injection layer and its adhesion to the organic layer 3. From the viewpoint of capability of injecting electrons into the organic layer 3, the thickness of the electron injection layer constituted by a coating film of an organic metal complex is preferably as small as possible. Specifically, the thickness is preferably not more than 10 nm, more preferably not more than 1 nm.

The total thickness of the electron injection layer constituted by the coating film of the organic metal complex and a protective electrode layer, i.e., the thickness of the whole cathode layer 4, is not restricted in particular as long as electrons can be injected into the organic layer 3, but is preferably 50 to 500 nm. The effects mentioned above are less likely to be obtained sufficiently when the thickness of the protective electrode layer is too small as compared with the electron injection layer. When the thickness of the auxiliary electrode is too large, the stress caused by the auxiliary electrode layer tends to increase so much that the growing rate of dark spots becomes higher.

The electron injection layer constituted by a coating film of a metal salt can be formed, for example, by coating the organic layer 3 with a coating liquid in which a metal salt is added to a predetermined solvent by a coating method such as spin coating and then eliminating the solvent. Examples of the metal contained in the metal salt include Ag, Al, Au, Be, Bi, Co, Cu, Fe, Ga, Hg, Ir, Mo, Mn, Nb, Ni, Os, Pb, Pd, Pt, Re, Ru, Sb, Sn, Ti, and Zr.

The metal salt may be any of organic and inorganic metal salts. Examples of the organic meal salts include substituted or unsubstituted aliphatic carboxylic salts, dicarboxylic acid salts, aromatic carboxylic acid salts, alcoholates, phenolates, and dialkylamides. Examples of the inorganic metal salts include halides.

The aliphatic carboxylic acid in the aliphatic carboxylic acid salts may be any of saturated and unsaturated aliphatic carboxylic acids. Examples of the saturated aliphatic carboxylic acid salt include metal salts of acetic acid, propionic acid, octanoic acid, isooctanoic acid, decanoic acid, and lauric acid. Examples of unsaturated aliphatic carboxylic acid salt include metal salts of oleic acid, ricinoleic acid, and linolic acid.

Examples of the dicarboxylic acid salts include metal salts of dicarboxylic acids such as citric acid, malic acid, and oxalic acid.

Examples of the aromatic carboxylic acid salts include metal salts of benzoic acid, o-tert-butylbenzoic acid, m-tertbutylbenzoic acid, p-tert-butylbenzoic acid, salicylic acid, m-hydroxybenzoic acid, and p-hydroxybenzoic acid. Preferred among them are metal salts of salicylic acid.

The alcoholates are metal salts of alcohols. Examples of alcohol components constituting the alcoholates include primary alcohols such as ethanol, n-propyl alcohol, and n-butyl alcohol; secondary alcohols such as isopropyl alcohol and isobutyl alcohol; and tertiary alcohols such as tert-butyl alcohol.

The phenolates are metal salts of phenols. The number of hydroxyl groups in the phenol component constituting a phenolate is not restricted in particular, but is preferably 1 or 2. The phenol compound may further include a substituent group (which is preferably a straight or branched alkyl group having a carbon number of 1 to 8) in addition to the hydroxyl groups. Preferably used in the present invention are phenol, naphthol, 4-phenylphenol, and the like.

Examples of halides which are inorganic metal salts include metal salts of chlorine, fluorine, bromine, and iodine.

Preferably, an auxiliary electrode layer is disposed on these electron injection layers. This can improve the efficiency at which electrons are injected into the organic layer 3, and prevent moisture or organic solvents from entering the organic layer 3 or electron injection layers. Though common metals can be used as a material of the auxiliary electrode layer since there are no restrictions on the work function and electric charge, metals which are easy to handle while having a high conductivity are preferably used. When the electron injection layer contains an organic material in particular, it will be preferred if the material of the auxiliary electrode layer is appropriately selected according to the species and adhesion of the organic material. Specific examples of the material used in the auxiliary electrode layer include Al, Ag, In, Ti, Cu, Au, Mo, W, Pt, Pd, and Ni. Using low-resistance metals such as Al and Ag among them can further enhance the electron injection efficiency. Using a metal compound such as TiN can yield a further higher sealability. These materials may be used singly or in combination of two or more species. Two or more species of the metal may be used as an alloy.

Spacer and Sealing Plate

Sealing the cathode layer 4 side of the organic EL element 9 with the sealing plate 5 as shown in FIG. 1 can prevent not only the organic layer 3 but also the anode layer 2 and cathode layer 4 from deteriorating. Here, arranging the spacer 7 in the nonluminescent region on the insulator layer 6 and bonding the spacer 7 to the sealing plate 5 can prevent the surface on the cathode layer 4 side of the organic EL element 9 and the sealing plate 5 from coming into contact with each other. The spacer 7 may be made of any of organic and inorganic materials (including metal materials). The spacer 7 can also be formed from a photosensitive material such as photoresist or photosensitive polyimide by a technique such as photolithography. An adhesive and an insulator such as glass spacer may be mixed together, and the resulting mixture may be applied to a region where the spacer 7 is to be formed.

Preferably, a sealing gas is inserted into a space formed by the surface of the organic EL element 9 on the cathode layer 4 side, the sealing plate 5 and the spacer 7. Preferably used as the sealing gas are inert gases such as Ar and He. The moisture content in the sealing gas is preferably not more than 100 ppm, more preferably not more than 10 ppm, further preferably not more than 1 ppm. The lower limit for the moisture content in the sealing gas is not restricted in particular, but a lower limit of about 0.1 ppm is quite favorable in that its effect of preventing the organic layer 3, anode layer 2, cathode layer 4, and the like from deteriorating is high.

The above-mentioned embodiment can enhance the transportability of holes and electrons injected into the organic layer from the first and second electrode layers (the electron transportability in particular) by causing the organic layer 3 to contain the vinyl polymer in accordance with the present invention, thereby sufficiently improving the emission efficiency. This vinyl polymer has a high heat resistance and excellent stability, and thus can stably attain a high-level emission efficiency for a long period. This organic EL element is quite useful in various fields of light-employing devices such as organic EL displays, optical pickups used for reading and writing memories, repeaters disposed in transmission lines for optical communications, and photocouplers.

The organic EL display of the present invention will now be explained.

FIG. 2 is a block diagram showing a preferred embodiment of the organic EL display. The organic EL display shown in FIG. 2 is a passive-driving, color conversion type organic EL element using a blue-emitting element as a pumping light source. The color conversion type refers to a method in which three-color fluorescent elements are pumped with visible light emissions of high-energy lines. In the color conversion method, the organic layer in the organic EL element is often caused to generate a blue emission, which is then used as a pumping light energy line so as to pump green and red fluorescent surfaces, thereby yielding green light and red light. This method is known as the color conversion method, since blue is converted into green and red.

In FIG. 2, a display part 14 is one in which a plurality of organic EL elements 9, each constituted by a substrate 1, an anode layer 2 (first electrode layer) formed on one side of the substrate 1, an organic layer 3 formed on the anode layer 2, and a cathode layer 4 (second electrode layer), are arranged two-dimensionally. In each of the organic EL elements 9, three organic layers 3 (luminescent layers), each containing the vinyl polymer in accordance with the present invention and a dopant for blue luminescence, are formed so as to correspond to three luminescent regions (e.g., 13a, 13b, 13c). In the three luminescent regions, one is a blue-emitting region, whereas the remaining two are green- and red-emitting regions.

Preferred examples of the material for the substrate 1 include transparent or semitransparent materials such as glass, silica, and resins.

On the substrate 1, fluorescent conversion filter films are provided in regions corresponding to two of the three luminescent regions formed in a single organic EL element as mentioned above, and regulate emission colors, whereby these regions become green- and red-emitting regions, respectively. The luminescent region provided with no fluorescent conversion filter film is a blue-emitting region.

Each fluorescence conversion filter film, which absorbs light due to an electric field emission in the organic layer 3 and causes a phosphor in the film to release light having a color different from that of the absorbed light, thereby converting emission colors, includes the phosphor, an optical absorber, and a binder in general. The fluorescence conversion filter film can be formed by patterning using a technique such as lithography or printing. In this case, the material of the fluorescence conversion filter film is preferably one which can form fine patterning, or one which is less likely to be damaged in the step of forming the upper layer (anode layer 2 or the like).

The phosphor contained in the fluorescent conversion filter film is preferably one with a high fluorescent quantum yield, or one exhibiting a high optical absorptivity in the luminescent wavelength region of the luminescent element as with laser coloring matters. Examples of the phosphor include rhodamine-based compounds, perylene-based compounds, cyanine-based compounds, phthalocyanine-based compounds including subphthalocyanine and the like, naphthaloimide-based compounds, condensed cyclic hydrocarbon-based compounds, condensed heterocyclic compounds, styryl-based compounds, and coumarin-based compounds. When the phosphor itself has an insufficient optical absorptivity, an optical absorber is preferably used together therewith, whereas one which does not quench the fluorescence is preferred as the optical absorber.

The binder is not restricted in particular as long as it does not quench the fluorescence, and can be used selectively from among known binders.

It will be preferred if a color filter for cutting off external light having a short wavelength which can be absorbed by constituent materials of the organic EL element 9 or the fluorescence conversion filter film is combined with the fluorescence conversion filter film, since it can further improve the light resistance of the element or its display contrast.

In the display part 14, two anode layers 2 are formed in parallel with each other on the substrate 1 and fluorescence conversion filter film so as to pass the three luminescent regions 13a to 13c in the organic EL element 9. Here, the anode layer 2 is arranged such that the luminescent regions 13a to 13c are not completely covered therewith, whereby each of the luminescent regions 13a to 13c is partly exposed. Each of the anode layers 2 is a common electrode for a plurality of (2 in FIG. 2) organic EL elements, whereas a power supply part 8, which will be explained later, is electrically connected to one end each of the anode layers 2. Such stripe-like anode layers 2 can be formed, for example, by forming an ITO film on the substrate 1 having a fluorescence conversion filter film patterned thereon and then carrying out patterning and etching.

Though not illustrated in detail, it will be preferred if an insulator layer such as $SiO_2$ layer or $Al_2O_3$ layer is provided on the anode layer 2 after the latter is formed. Preferably, the region of the insulator layer corresponding to the luminescent region is opened by etching, and the organic layer 3 is formed in the opening.

In the display part 14, the organic layers 3 containing the vinyl polymer in accordance with the present invention and the dopant for blue luminescence are formed in conformity to the individual luminescent regions of the organic EL element 9 so as to cover the individual luminescent regions while riding across the anode layers 2. The organic layers 3 can preferably be formed by a coating method such as spin coating.

In the display part 14, six cathode layers 4 are formed in conformity to the luminescent regions of the organic EL element 9 so as to pass over the organic layers 3. Each of the cathode layers 4 is a common electrode for a plurality of (2 in FIG. 2) organic EL elements, whereas a switching part 10 which will be explained later is connected to one end each of the cathode layers 4.

In the passive driving type organic EL display as in this embodiment, it will be preferred if the stripe-like anode layers 2 and stripe-like cathode layers 4 are arranged orthogonal to each other as shown in FIG. 2. Here, intersections between the anode layers 2 and cathode layers 4 in the luminescent regions correspond to respective pixels in the display.

In the nonluminescent regions of the display part 14, each organic EL element 9 is provided with a spacer 7. Bonding a sealing plate (not depicted) to the spacer 7 seals the surface on the cathode layer 4 side In the organic EL display shown in FIG. 2, a driving part 11 for controlling the displaying in the display part 14 includes the power supply part 8 for supplying a current or voltage to the anode layers 2 and cathode layers 4, the switching part 10 for sending an on/off control signal to the organic EL elements 9, and a control logical circuit 12 for them. The power supply part 8 is electrically connected to the anode layers 2, the switching part 10 is electrically connected to the cathode layers 4, and the power supply part 8 and switching part 10 are electrically connected to each other by way of the control logical circuit 12. The scheme of driving the organic EL device 9 in the display part 14 is not restricted in particular, whereby DC driving, pulse driving, or AC driving, for example, can be employed. It will be preferred if a DC, pulsed, or AC current or voltage is supplied at the time of driving, whereas the applied voltage is preferably about 2 to 30 V.

By causing the organic layer 3 to contain the vinyl polymer in accordance with the present invention and the blue-emitting dopant, the above-mentioned embodiment can yield a blue emission with a high color purity in the luminescent regions and keep this characteristic stably for a long period. The blue emission is taken out as it is from the substrate 1 side in the blue-emitting region. In the green and red luminescent regions, by pumping respective phosphors corresponding to green and red in the fluorescence conversion filter films with the blue emission employed as a pumping light energy line, green light and red light are taken out from the substrate 1 side. Therefore, this embodiment can realize an organic EL display which is excellent in luminance and color displaying functions and has a high heat resistance and a long life.

The organic EL display of the present invention is not restricted to the above-mentioned embodiment, but can be determined in view of the luminance, life, power consumption, and cost required for a target display product. For example, though FIG. 2 shows a so-called passive driving type organic EL display, the organic EL display of the present invention may be an active driving type full-color display using a polysilicon TFT or the like.

When the organic EL display of the present invention is a full-color display, full-color displaying is realized by forming three primary color elements of red, green, and blue (RGB). Here, the full-color displaying scheme may be not only the color conversion shown in the above-mentioned embodiment, but also any of RGB three-color juxtaposition, white luminescence method, and the like. The RGB three-color juxtaposition is a display scheme in which each of the RGB three-color luminescent elements is caused to emit light. The white luminescence method is a scheme in which a three-color filter used in a liquid crystal display device or the like cuts off a part of the wavelength of white luminescence, so as to realize full-color displaying. The white luminescence and color conversion methods make it unnecessary to prepare three-color luminescent elements, and thus can simplify the forming of luminescent elements and easily achieve a larger area.

By appropriately selecting a dopant for luminescence added to the luminescent layer of the organic EL element, the organic EL display of the present invention can employ any of the above-mentioned color display schemes. For example, when the organic layer of the organic EL element is caused to contain a dopant for blue luminescence, so as to yield a luminescent layer, the color conversion scheme can favorably be employed. When the organic layer of the organic EL element is caused to contain a dopant for phosphorescence, the RGB three-color juxtaposition method based on phosphorescence can favorably be employed.

EXAMPLES

The present invention will now be explained in further detail with reference to examples and comparative examples, though the present invention is not restricted to the following examples at all.

Example 1

In air atmosphere, 12.5 g (53.6 mmol) of 5-bromoacenaphthene represented by the following formula (56) and 13.4 g (59 mmol) of 2,3-dichloro-5,6-dicyano-1,4-benzoquinone (DDQ) represented by the following formula (57) were dissolved in 100 ml of toluene, and were caused to react for 6 hours at 130° C. The resulting crude product was extracted with hexane, and then was refined with column chromatography, whereby 6.0 g of 5-bromoacenaphthylene represented by the following formula (58) were obtained as a yellow solid.

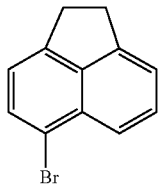

(56)

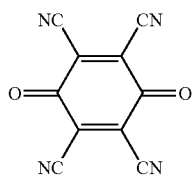

(57)

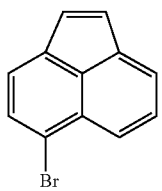

(58)

Next, 4.3 g (18.5 mmol) of thus obtained 5-bromoacenaphthylene and 5.0 g (18.5 mmol) of 1,3-diphenylbenzofuran represented by the following formula (59) were dissolved in 100 ml of toluene in nitrogen atmosphere, and they were caused to react for 24 hours at 120° C. After toluene was evaporated away from the reaction liquid, the residue was caused to react with 150 ml (18.5 mmol) of acetic acid added thereto for 1 hour at 145° C. in nitrogen atmosphere. The reactant was further caused to react with hydrogen bromide added thereto for 30 minutes at 110° C. The resulting crude product was refined with column chromatography, whereby 3.5 g of 3-bromo-7,12-diphenylbenzofluoranthene represented by the following formula (60) were obtained as a yellow solid.

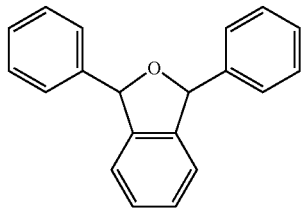

(59)

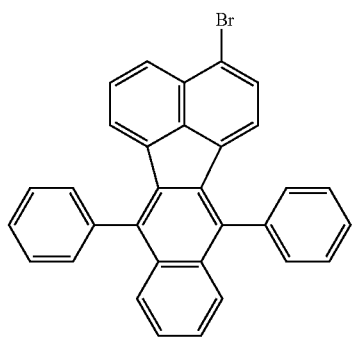

(60)

Subsequently, in nitrogen atmosphere, 3.4 g (7.0 mmol) of thus obtained 3-bromo-7,12-diphenylbenzofluoranthene, 1.6 g (10.0 mmol) of 4-vinylphenylboronic acid represented by the following formula (61), and 0.25 g of tetrakis(triphenylphosphino)palladium (Pd(pph$_3$)$_4$) were dissolved in a mixed solvent constituted by 15 ml of toluene and 4 ml of ethanol, so as to yield a solution. To thus obtained solution, 8 ml of 2-M aqueous sodium carbonate solution were added, and they were caused to react for 24 hours at 90° C. The resulting crude product was extracted with ether and then refined with column chromatography, whereby 3.1 g of 3-(4-vinylphenyl)-7,12-diphenylbenzofluoranthene represented by formula (7) were obtained as a pale yellow solid. The structure of thus obtained 3-(4-vinylphenyl)-7,12-diphenylbenzofluoranthene was identified by nuclear magnetic resonance (NMR), infrared absorption analysis (IR), and mass spectrometry (MS).

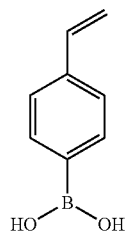

(61)

Next, 2 g of 3-(4-vinylphenyl)-7,12-diphenylbenzofluoranthene and 20 mg of benzoyl peroxide (BPO) as a radical polymerization initiator were dissolved in 15 ml of tetrahydrofuran (THF), and were held at 70° C. for 48 hours in nitrogen atmosphere, so as to effect a polymerization reaction. After the completion of the reaction, reprecipitation was carried out three times by using THF and methanol as good and poor solvents, respectively, and then similar reprecipitation was performed three times with the poor solvent replaced by ethyl acetate, whereby 1.73 g of a vinyl polymer whose monomer unit was 3-(4-vinylphenyl)-7,12-diphenylbenzofluoranthene were obtained. The weight-average molecular weight of thus obtained vinyl polymer was 49,000.

A 2-wt % toluene solution of thus obtained vinyl polymer was prepared and employed as a luminescent layer forming coating liquid.

A coating liquid containing a polyethylene dioxythiophene/polystyrene sulfonic acid copolymer (PEDOT/PSS) including constitutional units represented by the following formulae (62) to (64) was applied by spin coating onto a substrate formed with an ITO film as an anode layer, and was dried in vacuum for 5 minutes at 110° C., so as to form a hole transport layer having a thickness of 500 Å. Subsequently, the above-mentioned luminescent layer forming coating liquid was applied onto the hole transport layer, and was dried in vacuum for 5 minutes at 110° C., so as to form a luminescent layer having a thickness of 1,000 Å. On this luminescent layer, an LiF layer (having a thickness of 6 Å) as an electron injection layer and an Al layer (having a thickness of 2,500 Å) as an auxiliary electrode were deposited in vacuum in this order, so as to form a cathode layer, and the surface on the cathode layer side was sealed, whereby the aimed organic EL element was obtained.

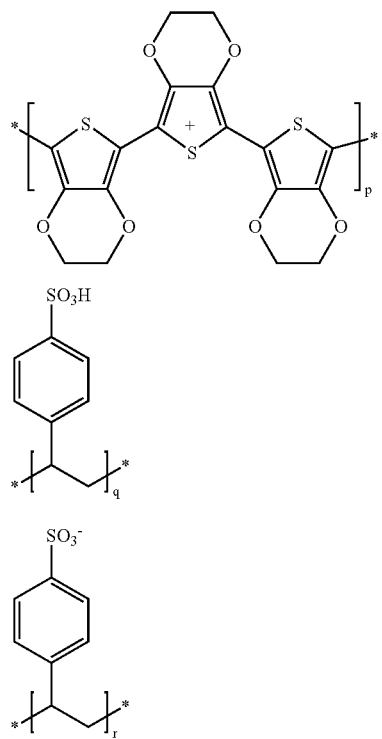

Thus obtained organic EL element yielded blue luminescence due to the vinyl polymer including 3-(4-vinylphenyl)-7,12-diphenylbenzofluoranthene as a monomer unit, whereas its current efficiency was 0.8 cd/A at the time of constant-current driving at 10 mA/cm². When a life test was conducted by constant-current driving at 10 mA/cm², the life until luminance decreased by half (luminance half-life as in the following) was 180 hours.

Example 2

Polyvinylcarbazole (PVK) represented by the following formula (65) as a hole-transporting host polymer and the vinyl polymer (vinyl monomer containing 3-(4-vinylphenyl)-7,12-diphenylbenzofluoranthene as a monomer unit) obtained by Example 1 were blended at a molar ratio of 70:30. A 2.0-wt % toluene solution of this blend was prepared, so as to yield a luminescent layer forming coating liquid.

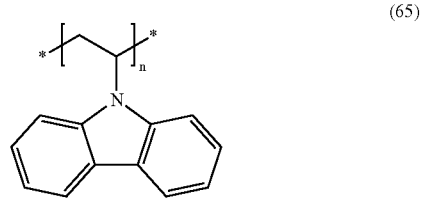

An organic EL element was produced in a manner similar to Example 1 except that a luminescent layer was formed by using thus obtained coating liquid. The resulting organic EL element yielded blue luminescence due to the vinyl polymer including 3-(4-vinylphenyl)-7,12-diphenylbenzofluoranthene as a monomer unit, whereas its current efficiency was 1.0 cd/A at the time of constant-current driving at 10 mA/cm². When a life test was conducted by constant-current driving at 10 mA/cm², the luminance half-life was 200 hours.

Example 3

A vinyl polymer including 3-(4-vinylphenyl)-7,12-diphenylbenzofluoranthene as a monomer unit was synthesized, and a 2-wt % toluene solution of the vinyl polymer was prepared in a manner similar to Example 1. Further, tetraphenylbutadiene represented by the following formula (66) was added as a blue-emitting dopant by a ratio of 2 wt % to the monomer unit in the vinyl polymer, so as to yield a luminescent layer forming coating liquid.

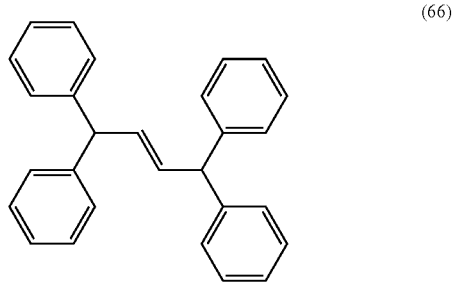

An organic EL element was produced in a manner similar to Example 1 except that a luminescent layer was formed by using thus obtained coating liquid. The resulting organic EL element yielded blue luminescence due to tetraphenylbutadiene, whereas its current efficiency was 2.1 cd/A at the time of constant-current driving at 10 mA/cm². When a life test was conducted by constant-current driving at 10 mA/cm², the luminance half-life was 330 hours.

Example 4

Polyvinylcarbazole represented by the above-mentioned formula (65) and oxadiazole as an electron-transporting molecule represented by the following formula (67) were blended at a ratio of 70:30, and a 2.0-wt % toluene solution of this blend was prepared. Further, poly-1-(4-vinylphenyl)-2,2-(3,7,12-triphenylbenzofluoranthene)-yl-amine was added by a ratio of 2 wt % to the monomer unit in the vinyl polymer, so as to yield a luminescent layer forming coating liquid.

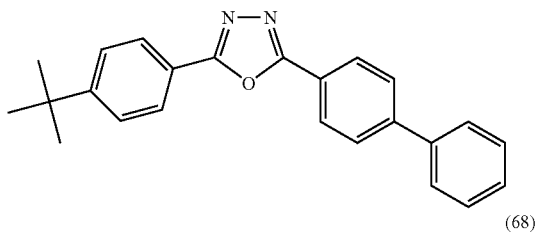

(67)

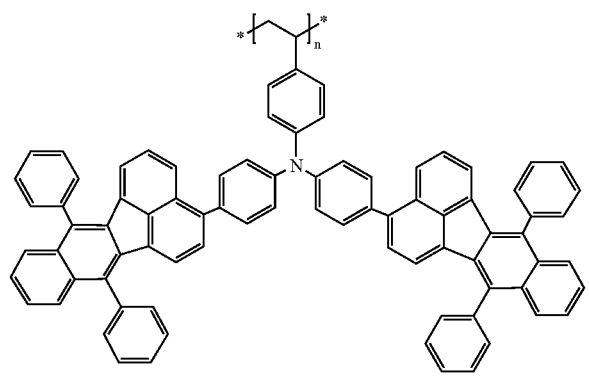

(68)

An organic EL element was produced in a manner similar to Example 1 except that a luminescent layer was formed by using thus obtained coating liquid. The resulting organic EL element yielded blue luminescence due to the vinyl polymer including poly-1-(4-vinylphenyl)-2,2-(3,7,12-triphenylbenzofluoranthene)-yl-amine, whereas its current efficiency was 3.0 cd/A at the time of constant-current driving at 10 mA/cm². When a life test was conducted by constant-current driving at 10 mA/cm², the luminance half-life was 500 hours.

Example 5

Into 6.7 mL of tetrahydrofuran (TFF), 0.53 g of 3-(4-vinylphenyl)-7,12-diphenylbenzofluoranthene represented by the above-mentioned formula (7), 0.47 g of N-vinylcarbazole represented by the above-mentioned formula (54), and 10 mg of benzoyl peroxide (BPO) as a radical polymerization initiator were dissolved, and they were held at 70° C. for 48 hours in nitrogen atmosphere, so as to effect a polymerization reaction. After the completion of the reaction, reprecipitation was carried out three times by using THF and methanol as good and poor solvents, respectively, and then similar reprecipitation was performed three times with the poor solvent replaced by ethyl acetate, whereby 0.6 g of a vinyl copolymer including 3-(4-vinylphenyl)-7,12-diphenylbenzofluoranthene (30 mol %) and N-vinylcarbazole (70 mol %) as monomer units was obtained. The weight-average molecular weight of thus obtained vinyl copolymer was 12,000. Subsequently, a 2-wt % toluene solution of the vinyl copolymer was prepared and employed as a luminescent layer forming coating liquid.

An organic EL element was produced in a manner similar to Example 1 except that a luminescent layer was formed by using thus obtained coating liquid. The resulting organic EL element yielded blue luminescence due to the fluoranthene structure in the vinyl copolymer, whereas its current efficiency was 2.5 cd/A at the time of constant-current driving at 10 mA/cm². When a life test was conducted by constant-current driving at 10 mA/cm², the luminance half-life was 350 hours.

Example 6

A 2.0-wt % toluene solution of the vinyl copolymer was prepared in a manner similar to Example 5, and tetraphenylbutadiene as a dopant for luminescence was added by a ratio of 2 wt % to the monomer unit in the vinyl polymer, so as to yield a luminescent layer coating liquid.

An organic EL element was produced in a manner similar to Example 1 except that a luminescent layer was formed by using thus obtained coating liquid. The resulting organic EL element yielded blue luminescence due to the fluoranthene structure in the vinyl copolymer and tetraphenylbutadiene, whereas its current efficiency was 2.5 cd/A at the time of constant-current driving at 10 mA/cm². When a life test was conducted by constant-current driving at 10 mA/cm², the luminance half-life was 400 hours.

Comparative Example 1

An organic EL element was produced in a manner similar to Example 1 except that polyvinylcarbazole (PVK) was used in place of the vinyl polymer including 1-(4-vinylphenyl)-4,9-diphenylbenzofluoranthene as a monomer unit. The resulting organic EL element yielded blue luminescence due to tetraphenylbutadiene, whereas its current efficiency was 1.6 cd/A at the time of constant-current driving at 10 mA/cm². When a life test was conducted by constant-current driving at 10 mA/cm², the luminance half-life was only 4 hours.

Comparative Example 2

First, a coating liquid containing PEDOT/PSS was applied onto an ITO substrate and dried, so as to form a hole transport layer having a thickness of 500 Å in a manner similar to Example 1. Subsequently, a xylene solution containing 1.5 mass % of poly[2-(6-cyano-6-methylheptyloxy)-1,4-phenylene] (CN-PPP with a weight-average molecular weight of 10,000) which was a π-conjugated polymer emitting blue fluorescence was applied onto the hole transport layer, and was dried in vacuum for 1 hour at 180° C., so as to form a luminescent layer having a thickness of 1,000 Å. On the luminescent layer, a Ca layer (having a thickness of 60 Å) as an electron injection layer and an Al layer (having a thickness of 2,500 Å) as an auxiliary electrode layer were deposited in vacuum in this order, so as to form a cathode layer, and the surface on the cathode layer side was sealed, whereby an organic EL element was obtained.

In thus obtained organic EL element, no luminescence was seen upon constant-current driving at 10 MA/cm².

Comparative Example 3

Tetraphenylbutadiene was added as a dopant by a ratio of 3 mass % to the solid content of CN-PPP, so as to prepare a luminescent layer forming coating liquid. An organic EL element was produced in a manner similar to Comparative Example 2 except that a luminescent layer was formed by using this coating liquid. The resulting organic EL element yielded blue luminescence, whereas its current efficiency at the time of constant-current driving at 10 mA/cm² was less than 0.1 cd/A.

Industrial Applicability

As explained in the foregoing, the organic EL element and organic EL display of the present invention can achieve all of the heat resistance, life, and emission efficiency at high levels, and can stably attain excellent luminance and color displaying functions for a long period.

The invention claimed is:

1. An organic EL (electroluminescence) element comprising:
a substrate;
a first electrode layer formed on one side of the substrate;
an organic layer formed on the first electrode layer; and
a second electrode layer formed on the organic layer;
the organic layer containing a vinyl polymer obtained by polymerizing a polymerizable monomer containing a compound represented by the following general formula (1) or (2):

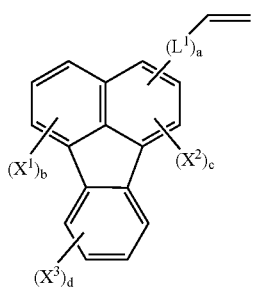

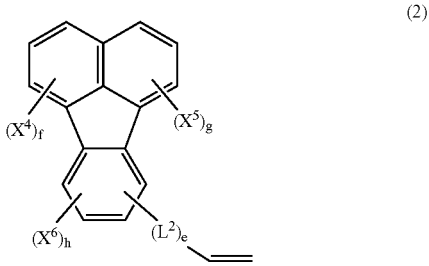

wherein each of $L^1$ and $L^2$ is a substituted or unsubstituted phenylene group; $X^1$, $X^2$, $X^3$, $X^4$, $X^5$, and $X^6$ are either the same or different from each other, each referring to alkyl group, alkoxy group, aryl group, aryloxy group, heterocyclic group, amino group, halogen atom, or cyano group; each of a and e is 1; each of b, f, g, and h is an integer of 0 to 3; c is an integer of 0 to 2; d is an integer of 0 to 4; and substituents combined to carbon atoms constituting a fluoranthene ring may be combined together so as to form a ring.

2. An organic EL element according to claim 1, wherein the vinyl polymer is obtained by polymerizing a polymerizable monomer containing a compound represented by the following general formula (3):

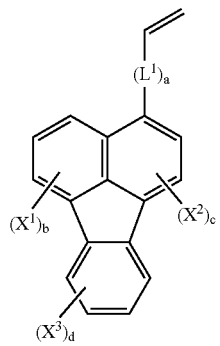

wherein $L^1$ is a substituted or unsubstituted phenylene group; $X^1$, $X^2$, and $X^3$ are either the same or different from each other, each referring to alkyl group, alkoxy group, aryl group, aryloxy group, heterocyclic group, amino group, halogen atom, or cyano group; a is 1; b is an integer of 0 to 3; c is an integer of 0 to 2; d is an integer of 0 to 4; and substituents combined to carbon atoms constituting a fluoranthene ring may be combined together so as to form a ring.

3. An organic EL element according to claim 1, wherein the vinyl polymer is a copolymer of at least one species of the compound represented by one of the general formulae (1) and (2) and at least one species of vinyl monomer having a structure different from that of the compound.

4. An organic EL element according to claim 1, wherein the organic layer includes a luminescent layer and an electron transport layer formed between a layer in the first or second electrode layer for injecting an electron into the luminescent layer and the luminescent layer, at least one of the luminescent layer and electron transport layer containing the vinyl polymer.

5. An organic EL element according to claim 1, wherein the organic layer further contains a blue-emitting dopant.

6. An organic EL display comprising:
a display part in which a plurality of organic EL elements, each constituted by a substrate, a first electrode layer formed on one side of the substrate, an organic layer formed on the first electrode layer, and a second electrode layer formed on the organic layer, are arranged;
a power supply part, electrically connected to the first and second electrodes, for supplying a voltage or current to the first and second electrodes; and
a switching part for turning on or off the organic EL elements;
the organic layer containing a vinyl polymer obtained by polymerizing a polymerizable monomer containing a compound represented by the following general formula (1) or (2):

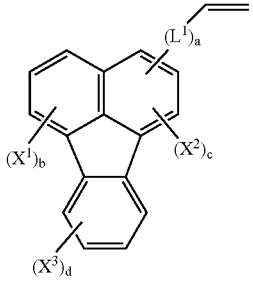

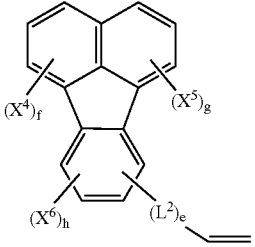

wherein each of $L^1$ and $L^2$ is a substituted or unsubstituted phenylene group; $X^1$, $X^2$, $X^3$, $X^4$, $X^5$, and $X^6$ are either the same or different from each other, each referring to alkyl group, alkoxy group, aryl group, aryloxy group, heterocyclic group, amino group, halogen atom, or cyano group; each of a and e is 1; each of b, f, g, and h is an integer of 0 to 3; c is an integer of 0 to 2;, d is an integer of 0 to 4; and substituents combined to carbon atoms constituting a fluoranthene ring may be combined together so as to form a ring.

7. An organic EL element according to claim 2, wherein the vinyl polymer is a copolymer of at least one species of the compound represented by general formula (3) and at least one species of a vinyl polymer having a structure different from that of the compound.

* * * * *